United States Patent
Hayashi

(10) Patent No.: US 11,032,109 B2
(45) Date of Patent: Jun. 8, 2021

(54) COMMUNICATION PROCESSING SYSTEM, COMMUNICATION PROCESSING METHOD, COMMUNICATION PROCESSING APPARATUS, COMMUNICATION MANAGING APPARATUS, AND CONTROL METHODS AND CONTROL PROGRAMS OF COMMUNICATION PROCESSING APPARATUS AND COMMUNICATION MANAGING APPARATUS

(71) Applicant: NEC CORPORATION, Tokyo (JP)

(72) Inventor: Takeshi Hayashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 335 days.

(21) Appl. No.: 16/083,566

(22) PCT Filed: Feb. 13, 2017

(86) PCT No.: PCT/JP2017/005158
§ 371 (c)(1),
(2) Date: Sep. 10, 2018

(87) PCT Pub. No.: WO2017/163665
PCT Pub. Date: Sep. 28, 2017

(65) Prior Publication Data
US 2020/0304341 A1   Sep. 24, 2020

(30) Foreign Application Priority Data
Mar. 24, 2016 (JP) .............................. JP2016-060166

(51) Int. Cl.
*H04L 12/66* (2006.01)
*H04L 12/46* (2006.01)
(52) U.S. Cl.
CPC .......... *H04L 12/66* (2013.01); *H04L 12/4633* (2013.01); *H04L 12/4641* (2013.01)

(58) Field of Classification Search
None
See application file for complete search history.

(56) References Cited

U.S. PATENT DOCUMENTS 7,320,071 B1 * 1/2008 Friedman ................. G06F 21/85
                                                          713/165
2006/0161617 A1 * 7/2006 Zhong ..................... H04L 67/38
                                                          709/203
(Continued)

FOREIGN PATENT DOCUMENTS

| EP | 2 813 945 A1 | 12/2014 |
| JP | 2015-154322 A | 8/2015 |
| JP | 2016-34116 A | 3/2016 |

OTHER PUBLICATIONS

Yoshikazu Watanabe et al, "STCoS: Software-defined Traffic Control for Smartphones", IEEE, RTAS, 2014, pp. 297-307.
(Continued)

*Primary Examiner* — Kenny S Lin
(74) *Attorney, Agent, or Firm* — Sughrue Mion, PLLC

(57) ABSTRACT

This invention is directed to a communication processing apparatus that secures a safe connection from a non-IP-connection device to an IP-connection cloud (server). This communication processing apparatus includes a first connection unit that connects devices, a second connection unit that connects to servers, a switching unit that switches connections of the devices and the servers between the first connection unit and the second connection unit, a determiner that determines whether connection of a device to the first connection unit is permitted or unpermitted, and a connection controller that controls the switching unit in accordance with a determination result from the determiner.

13 Claims, 20 Drawing Sheets

(56) References Cited

U.S. PATENT DOCUMENTS

| | | | | |
|---|---|---|---|---|
| 2008/0005426 A1* | 1/2008 | Bacastow | ............... | G06F 21/78 |
| | | | | 710/62 |
| 2011/0153879 A1* | 6/2011 | Chen | ....................... | H04L 69/08 |
| | | | | 710/30 |
| 2013/0111561 A1 | 5/2013 | Kaushik | | |
| 2014/0215637 A1 | 7/2014 | Moore | | |
| 2016/0099948 A1 | 4/2016 | Ott et al. | | |
| 2017/0264649 A1* | 9/2017 | Sonar | ....................... | G06F 21/82 |
| 2017/0318112 A1* | 11/2017 | Johnsimon | .......... | H04L 67/2814 |

OTHER PUBLICATIONS

Peter Brown, "USB Device Redirection, Configuration, and Usage in VMware Horizon with View", VMware Inc., Jul. 2014, pp. 1-36.
International Search Report of PCT/JP2017/005158 dated May 16, 2017 [PCT/ISA/210].
Communication dated Apr. 27, 2021 by the Japanese Patent Office in application No. 2020-072681.

\* cited by examiner

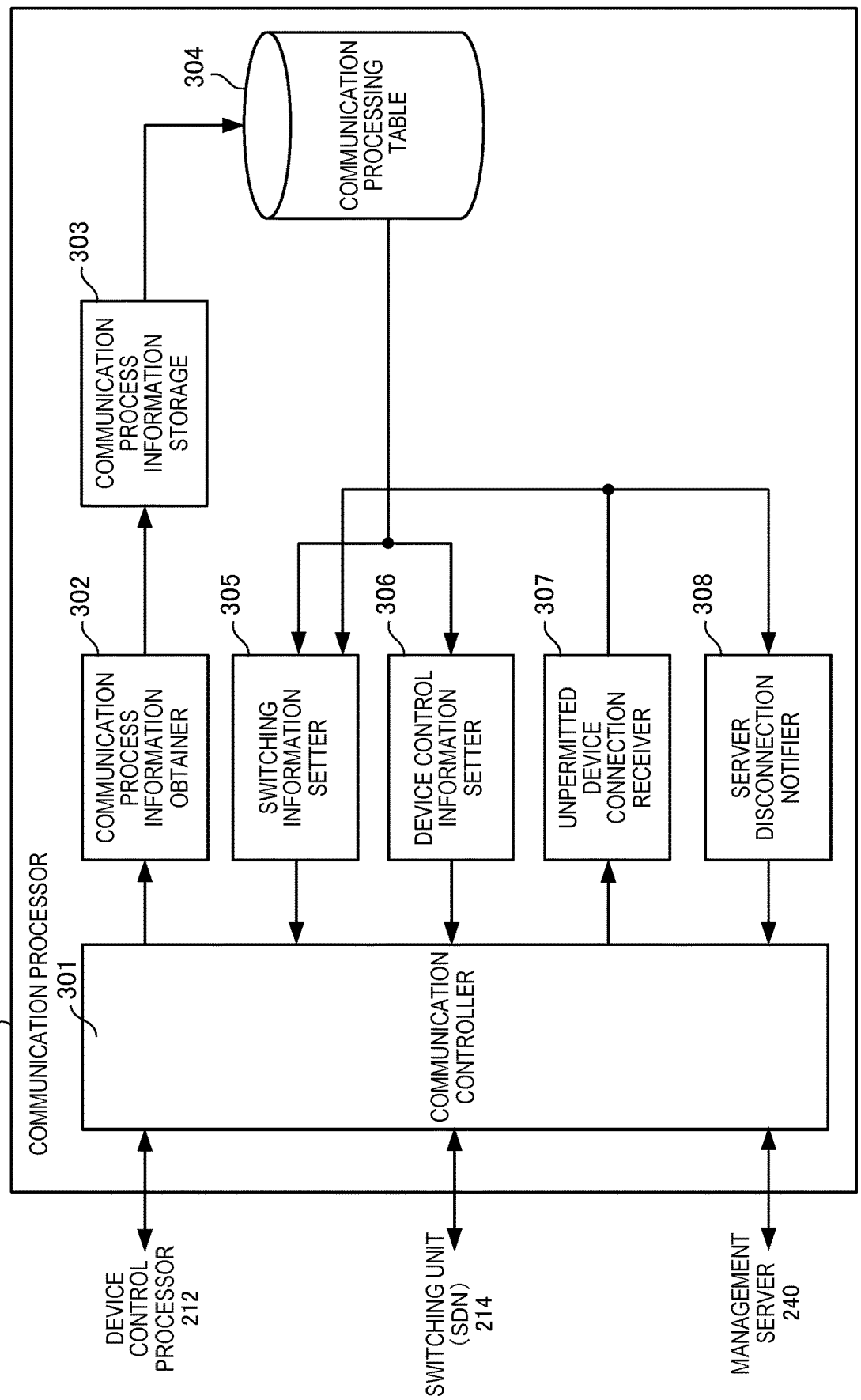

FIG. 3B

COMMUNICATION PROCESSING TABLE

341

| TYPE | REGISTRATION ID |
|---|---|
| USB | A00001 |
| USB | A00002 |
| Bluetooth | B00001 |
| Bluetooth | B00002 |
| …… | |

342

| TYPE | REGISTRATION ID | APPLICATION | COMMUNICATION SERVER | PORT NUMBER |
|---|---|---|---|---|
| USB | A00001 | App-a | AA.BB.CC.01 | 80 |
| USB | A00002 | App-a, App-d | AA.BB.CC.01, AA.CC.DD.02 | 80, 20, 21 |
| Bluetooth | B00001 | OTHER THAN App-a | OTHER THAN AA.BB.CC.01 | 80 |
| Bluetooth | B00002 | All | AA.BB.CC.01 | 80, 22 |
| …… | | | | |

343

| APPLICATION NAME | APPLICATION ID |
|---|---|
| App-a | app0001 |
| App-b | app0002 |
| App-c | app0003 |
| App-d | app0004 |
| …… | |

344

| PROCESSING WHEN UNPERMITTED DEVICE IS CONNECTED | ENABLE COMMUNICATION TO MANAGEMENT SERVER (AA.BB.CC.DD) INTERRUPT OTHER COMMUNICATIONS | … |
|---|---|---|
| PROCESSING WHEN PERMITTED DEVICE IS CONNECTED | CONNECT TO PERMITTED SERVER BY USING PERMITTED APPLICATION | … |

DEVICE PROCESSING TABLE

341

| TYPE | REGISTRATION ID |
|------|-----------------|
| USB | A00001 |
| USB | A00002 |
| Bluetooth | B00001 |
| Bluetooth | B00002 |
| …… | |

442

| TYPE | REGISTRATION ID | APPLICATION |
|------|-----------------|-------------|
| USB | A00001 | App-a |
| USB | A00002 | App-a, App-d |
| Bluetooth | B00001 | OTHER THAN App-a |
| Bluetooth | B00002 | All |
| …… | | |

343

| APPLICATION NAME | APPLICATION ID |
|------------------|----------------|
| App-a | app0001 |
| App-b | app0002 |
| App-c | app0003 |
| App-d | app0004 |
| …… | |

511

CONNECTION TABLE

542

| APPLICATION | COMMUNICATION SERVER | PORT NUMBER |
|---|---|---|
| App-a | AA.BB.CC.01 | 80 |
| App-a、App-d | AA.BB.CC.01、AA.CC.DD.02 | 80、20、21 |
| OTHER THAN App-a | OTHER THAN AA.BB.CC.01 | 80 |
| All | AA.BB.CC.01 | 80、22 |
| …… | …… | …… |

544

| PROCESSING CONTENTS | INPUT PORT | OUTPUT PORT |
|---|---|---|
| ENABLE COMMUNICATION TO MANAGEMENT SERVER (AA.BB.CC.DD) INTERRUPT OTHER COMMUNICATIONS | / | / |
| CONNECT PERMITTED APPLICATION TO PERMITTED SERVER | A | X |
| ⋮ | | |

F I G. 5B

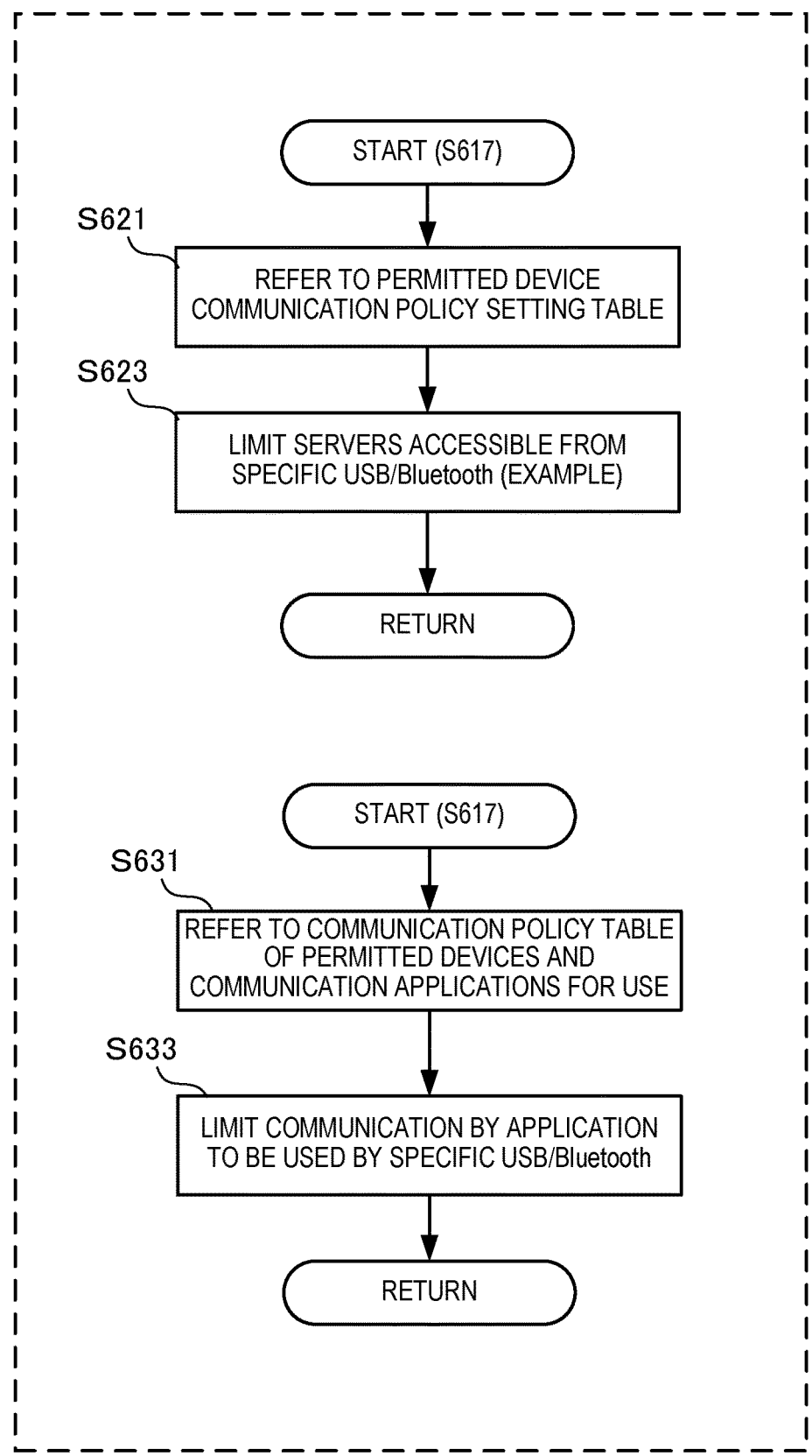
F I G. 6B

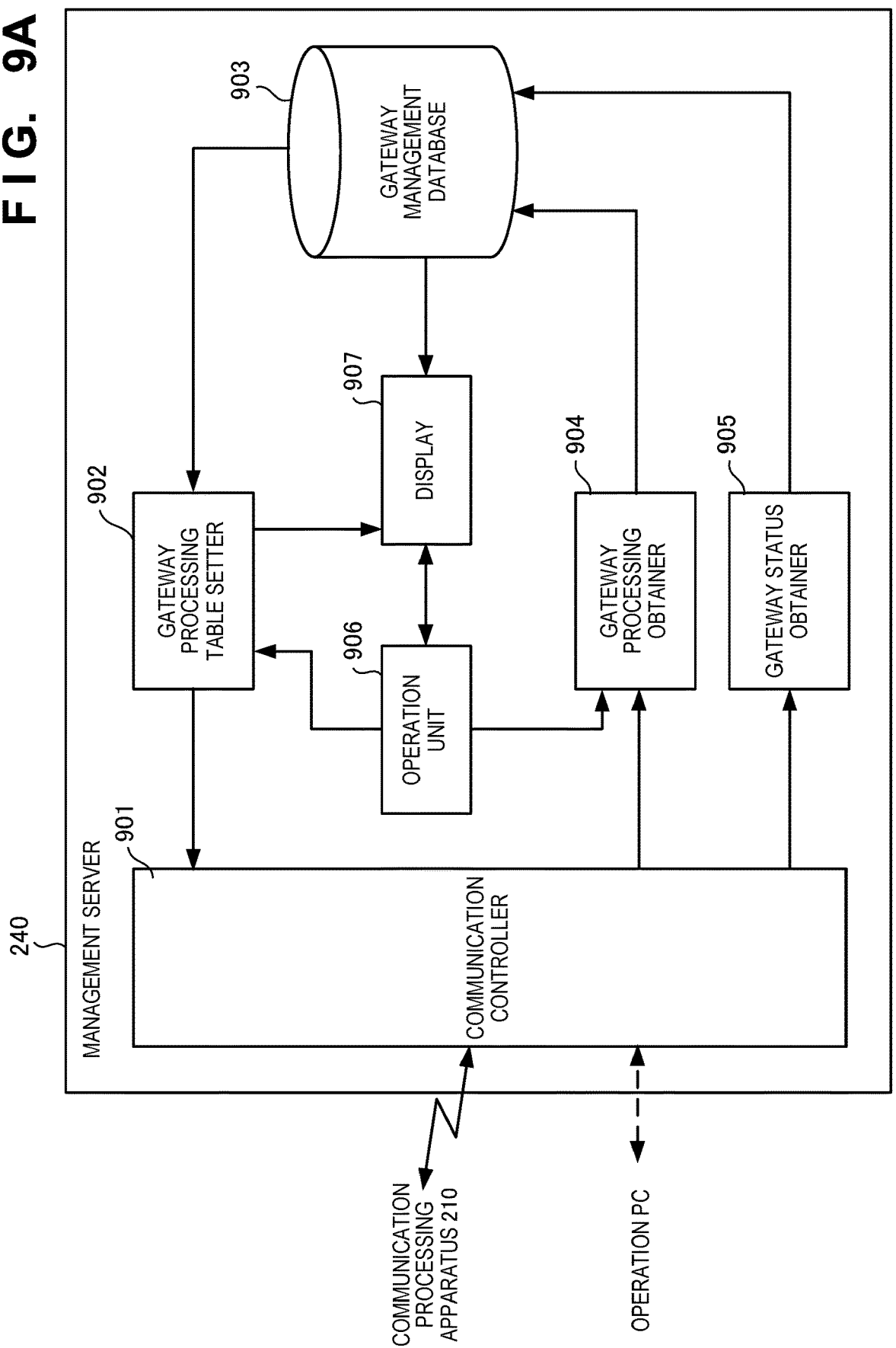

COMMUNICATION UNPERMITTED APPLICATION LIST

| No | DATE/TIME | APPLICATION NAME | PATH NAME |
|---|---|---|---|
| 1 | 2015/10/20 21:09 | Process2 | /usr/local/bin |
| 2 | 2015/10/20 21:09 | Process3 | /sbin |
| 3 | 2015/10/20 21:09 | Process4 | /sbin |
| 4 | 2015/10/20 21:10 | Process2 | /usr/local/bin |
| 5 | 2015/10/20 21:10 | Process2 | /usr/local/bin |

1031

DISPLAY ABNORMAL COMMUNICATION LIST.
WHEN YOU CLICK COMMUNICATION PERMISSION TARGET
ROW, POPUP IS DISPLAYED.

1030

F I G. 10C

COMMUNICATION PROCESSING SYSTEM, COMMUNICATION PROCESSING METHOD, COMMUNICATION PROCESSING APPARATUS, COMMUNICATION MANAGING APPARATUS, AND CONTROL METHODS AND CONTROL PROGRAMS OF COMMUNICATION PROCESSING APPARATUS AND COMMUNICATION MANAGING APPARATUS

CROSS REFERENCE TO RELATED APPLICATIONS

This application is a National Stage of International Application No. PCT/JP2017/005158, filed Feb. 13, 2017, claiming priority based on Japanese patent application No. 2016-060166, filed on Mar. 24, 2016, the disclosure of which is incorporated herein in its entirety by reference.

TECHNICAL FIELD

The present invention relates to a communication processing system, communication processing method, communication processing apparatus, communication managing apparatus, and control methods and control programs of the communication processing apparatus and communication managing apparatus.

BACKGROUND ART

In the above technical field, patent literature 1 describes a technique which disconnects an unpermitted device by collation with an apparatus permission whitelist or the like, when a host apparatus having a USB device connection port has received a connection request from a USB device of HID (Human Interface Device: a mouse, keyboard, or the like). Also, non-patent literature 1 describes a technique which implements communication optimization of an IP network connection (a connection using a network address) by flexible communication path control by using an OFC (OpenFlow Controller) and OFS (OpenFlow Switch) controlled by OpenFlow.

CITATION LIST

Patent Literature

Patent literature 1: US Patent Application Publication No. 2014/0215637

Non-Patent Literature

Non-patent literature 1: Y. Watanabe, et al, STCoS: Software-defined Traffic Control for Smartphones, IEEE, RTAS, 2014

SUMMARY OF THE INVENTION

Technical Problem

In the technique disclosed in patent literature 1, however, communication restriction is limited to a connection between a USB device and a host apparatus as a connection destination via a USB. Especially when the host apparatus is a network apparatus capable of connecting to an external network, there is no cooperation with network communication, so the security (safety) from a USB device to a cloud (server) for connecting to the external network is insufficient. Also, the technique disclosed in non-patent literature 1 is applicable to the region of security, but does not support security (safety) when there is a connection request from a device (Bluetooth®/a USB device) using a non-IP connection (a connection using a device ID or device address).

That is, security measures are provided between a USB device and a host apparatus as a connection destination connected via a USB, and between a network apparatus and a cloud (server) as a connection destination connected across a network, but there is no security measure from the USB device to the cloud (server). Therefore, if, for example, a device having a security (safety) problem is connected, there is nothing to do but disconnect the problematic device from the host apparatus of the network.

As described above, it has been impossible to secure a safe connection from a non-IP-connection device to an IP-connection cloud (server) by integrating the security (safety) of non-IP connection and the security (safety) of IP connection.

The present invention enables to provide a technique of solving the above-described problem.

Solution to Problem

One example aspect of the present invention provides a communication processing apparatus comprising:
a first connection unit that connects devices;
a second connection unit that connects to servers;
a switching unit that switches connections of said devices and said servers between said first connection unit and said second connection unit;
a determiner that determines whether connection of a device to said first connection unit is permitted or unpermitted; and
a connection controller that controls said switching unit in accordance with a determination result from said determiner.

Another example aspect of the present invention provides a method of controlling a communication processing apparatus, the method comprising:
causing a switching unit to switch connections of devices and servers, between a first connection unit that connects the devices and a second connection unit that connects to the servers;
determining whether connection of a device to the first connection unit is permitted or unpermitted; and
controlling the switching unit in accordance with a determination result in the determining step.

Still other example aspect of the present invention provides a program of controlling a communication processing apparatus, that causes a computer to execute a method, comprising:
causing a switching unit to switch connections of devices and servers, between a first connection unit that connects the devices and a second connection unit that connects to the servers;
determining whether connection of a device to the first connection unit is permitted or unpermitted; and
controlling the switching unit in accordance with a determination result in the determining step.

Still other example aspect of the present invention provides a communication managing apparatus comprising:
a holder that holds connection information containing a condition for determining whether each of connections of devices is permitted or unpermitted and connections of the devices to servers;

a setter that sets the connection information in a connection controller of a communication processing apparatus, said connection controller controlling connection between a first connection unit that connects the devices and a second connection unit that connects to the servers;

an obtainer that obtains connection states by said connection controller based on the connection information; and a presenter that presents the obtained connection states.

Still other example aspect of the present invention provides a method of controlling a communication managing apparatus, the method comprising:

causing a holder to hold connection information containing a condition for determining whether each of connections of devices is permitted or unpermitted and connections of the devices to servers;

setting the connection information in a connection controller of a communication processing apparatus, the connection controller controlling connection between a first connection unit that connects the devices and a second connection unit that connects to the servers;

obtaining connection states by the connection controller based on the connection information; and presenting the obtained connection states.

Still other example aspect of the present invention provides a program of controlling a communication managing apparatus, that causes a computer to execute a method, comprising:

causing a holder to hold connection information containing a condition for determining whether each of connections of devices is permitted or unpermitted and connections of the devices to servers;

setting the connection information in a connection controller of a communication processing apparatus, the connection controller controlling connection between a first connection unit that connects the devices and a second connection unit that connects to the servers;

obtaining connection states by the connection controller based on the connection information; and presenting the obtained connection states.

Still other example aspect of the present invention provides a communication processing system comprising:

a holder that holds connection information containing a condition for determining whether each of connections of devices is permitted or unpermitted and connections of the devices to servers;

a switching unit that switches the connections of the devices and the servers between a first connection unit that connects the devices and a second connection unit that connects to the servers;

a determiner that determines whether connection of a device to said first connection unit is permitted or unpermitted, in accordance with the connection information; and a connection controller that controls said switching unit based on the connection information, in accordance with a determination result from said determiner.

Still other example aspect of the present invention provides a communication processing method comprising:

causing a holder to hold connection information containing a condition for determining whether each of connections of devices is permitted and connections of the devices to servers;

causing a switching unit to switch connections of the devices and the servers between a first connection unit that connects the devices and a second connection unit that connects to the servers;

determining whether connection of a device to the first connection unit is permitted or unpermitted, in accordance with the connection information; and controlling the switching unit based on the connection information, in accordance with a determination result in the determining step.

Advantageous Effects of Invention

According to the present invention, it is possible to secure a safe connection from a non-IP-connection device to an IP-connection cloud (server).

BRIEF DESCRIPTION OF DRAWINGS

FIG. 3A is a block diagram showing the functional configuration of a communication processor according to the second example embodiment of the present invention;

FIG. 3B is a view showing the arrangement of a communication processing table according to the second example embodiment of the present invention;

FIG. 4B is a view showing the arrangement of a device processing table according to the second example embodiment of the present invention;

FIG. 5B is a view showing the arrangement of a connection table according to the second example embodiment of the present invention;

FIG. 6B is a flowchart showing the procedure of a filtering process according to the second example embodiment of the present invention;

FIG. 9A is a block diagram showing the functional configuration of a management server according to the second example embodiment of the present invention;

FIG. 10C is a view showing a display screen example of the visualized management monitor according to the second example embodiment of the present invention.

DESCRIPTION OF EXAMPLE EMBODIMENTS

Example embodiments of the present invention will now be described in detail with reference to the drawings. It should be noted that the relative arrangement of the components, the numerical expressions and numerical values set forth in these example embodiments do not limit the scope of the present invention unless it is specifically stated otherwise.

Note that a term "non-IP connection" used in this specification indicates a connection complying with a communication protocol such as a USB or Bluetooth® based on a device ID or device address, and a term "IP connection" indicates a connection complying with an Internet protocol based on a network address such as an Internet address.

First Example Embodiment

A communication processing apparatus 110 as the first example embodiment of the present invention will be explained below with reference to FIG. 1. The communication processing apparatus 110 is an apparatus which connects a non-IP device to an IP system.

Figure 1:
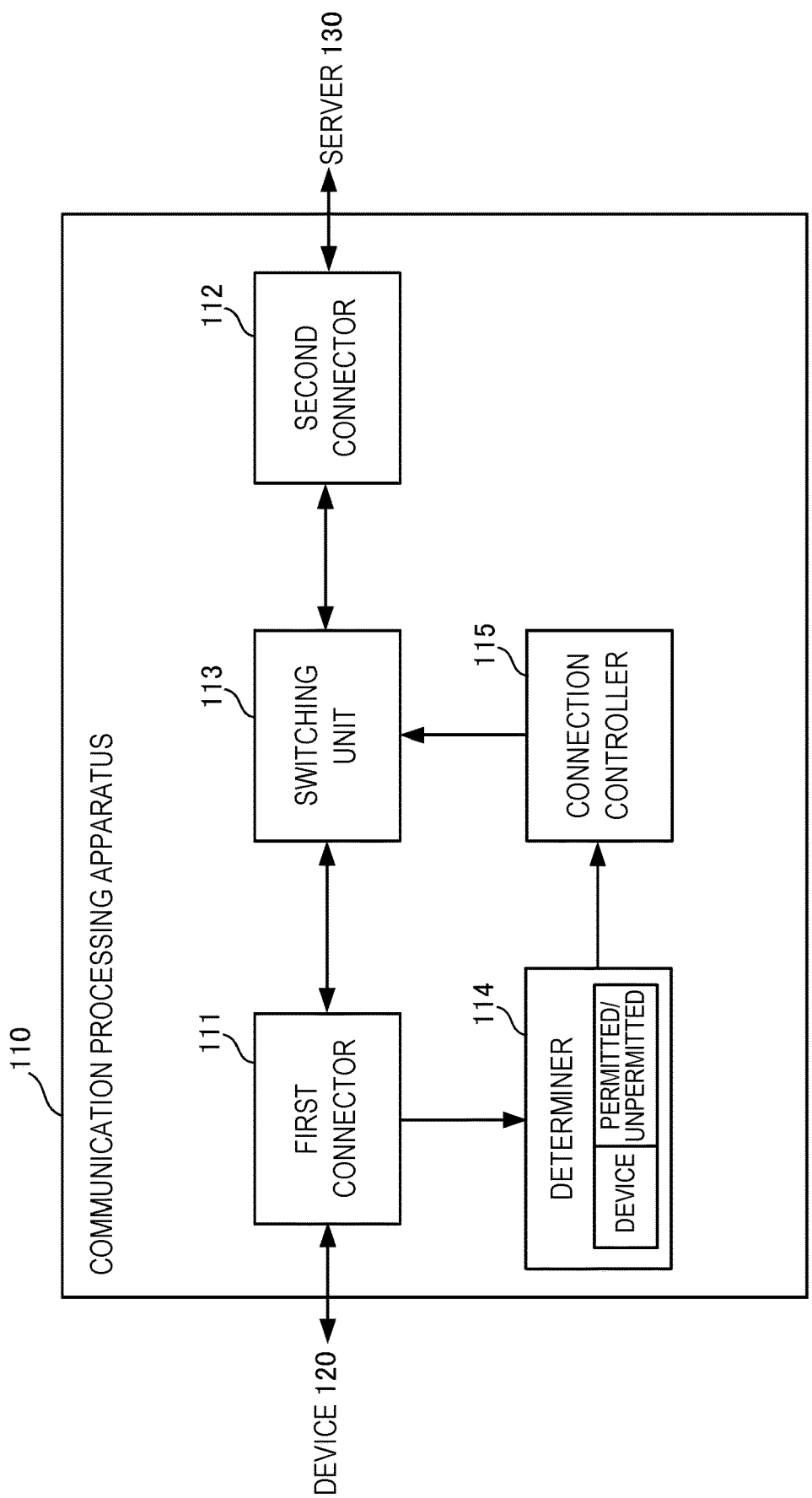
FIG. 1 is a block diagram showing the arrangement of a communication processing apparatus according to the first example embodiment of the present invention.

As shown in FIG. 1, the communication processing apparatus 110 includes a first connection unit 111, a second connection unit 112, a switching unit 113, a determiner 114, and a connection controller 115. The first connection unit 111 connects a device 120. The second connection unit 112 connects to a server 130. The switching unit 113 switches the connections of the device 120 and server 130 between the first connection unit 111 and the second connection unit 112. The determiner 114 determines whether the connection of the device 120 to the first connection unit 111 is permitted. The connection controller 115 controls the switching unit 113 in accordance with the determination result from the determiner 114.

According to this example embodiment, a safe connection from a non-IP-connection device to an IP-connection cloud (server) can be secured by switching the connections from the device to the server in accordance with the determination result indicating whether the connection of the device is permitted.

Second Example Embodiment

Next, a communication processing apparatus according to the second example embodiment of the present invention will be explained. The communication processing apparatus according to this example embodiment controls a connection between a device and server as follows, when determining that the connection of the device is not permitted, or when determining that the connection of the device is permitted.

When determining that the connection of the device is not permitted, the communication processing apparatus disconnects all devices and servers connected to the apparatus. Also, even when determining that the connection of the device is permitted, the communication processing apparatus performs control so as to limit the connection between the device and server. For example, the communication processing apparatus performs control so as to limit application processing to be provided for the connected device.

These control operations are executed in accordance with the settings by an external communication managing apparatus which manages communication, and this external communication managing apparatus is notified of the connection state of a device and server. In particular, the external communication managing apparatus is emergently notified of the disconnection of all devices and servers when the connection of the device is found to be unpermitted.

<<Communication Processing System>>

Figure 2:
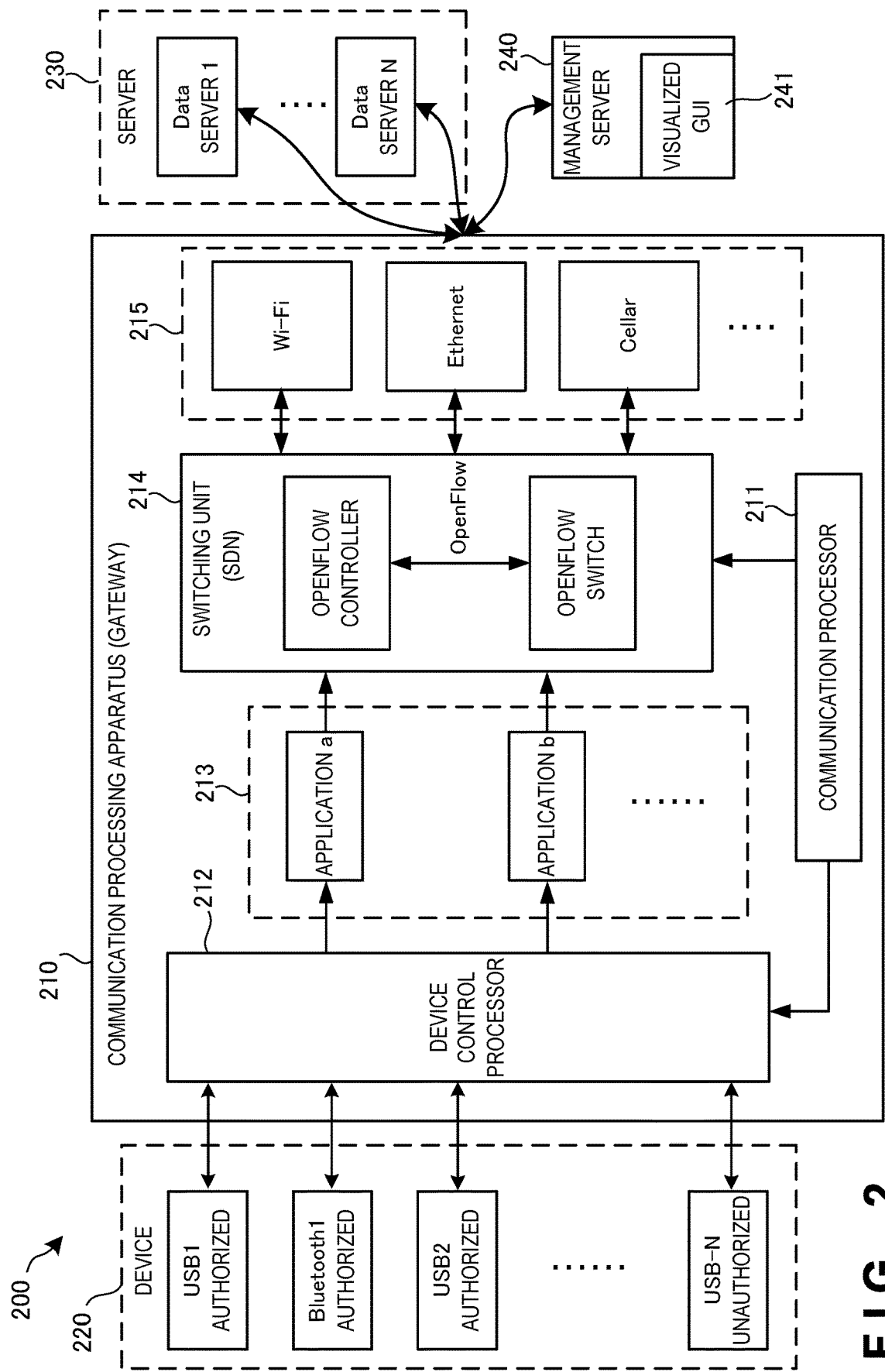
FIG. 2 is a block diagram showing the configuration of a communication processing system including a communication processing apparatus according to the second example embodiment of the present invention.

FIG. 2 is a block diagram showing the configuration of a communication processing system 200 including a communication processing apparatus 210 according to this example embodiment. Note that in the following explanation, an example in which each communication processing apparatus 210 performs determination on a connected device and performs processing such as server disconnection based on settings from a management server 240 will be described. However, the management server 240 may also collectively manage a plurality of communication processing apparatuses 210, perform determination on a connected device, and perform processing such as server disconnection.

The communication processing system 200 includes the communication processing apparatus 210 such as a gateway, devices 220, servers 230 including a cloud, and the management server 240.

The communication processing apparatus 210 includes a communication processor 211 for controlling the communication processing apparatus 210, a device control processor 212, an application group 213 (to be abbreviated as an application hereinafter), a switching unit 214 using an SDN (Software-Defined Network), and a communicator 215 for connecting to the servers 230. The communication processor 211 processes the whole communication processing apparatus 210 in accordance with a setting instruction from the management server 240, and presents the processing state of the communication processing apparatus 210 to the management server 240. The device control processor 212 controls connections to the non-IP devices 220 by a USB (Universal Serial Bus), Bluetooth®, or the like. Then, the device control processor 212 determines whether the device is permitted or unpermitted, and disconnects the device if the device is unpermitted. After that, the device control processor 212 notifies the communication processor 211 that the unpermitted device is connected. The application 213 is an application which obtains data from each of connected devices 220, and transmits data to the servers 230 across the network. The switching unit 214 includes an SDN formed by an openflow controller and openflow switch, and controls switching for determining the servers 230 to which data from a device processed by the application 213 is to be transferred. The communicator 215 transfers the data from the device to the servers 230 by Wi-Fi, Ethernet®, Cellular, or the like.

The devices 220 are devices such as sensors which perform non-IP connection to the device control processor 212 by a USB or Bluetooth®, and detects data to be collected by the servers 230.

The servers 230 collect the data detected by the devices 220 while maintaining the security (safety) via the communication processing apparatus 210, analyzes the collected data, and provides the service.

The management server 240 is a server for managing data transfer from the devices 220 to the servers 230 in the communication processing apparatus 210. The management server 240 has a visualized GUI 241. The user can visually observe, e.g., the states of the function of data transfer to the communication processing apparatus 210, the procedure when a device is unpermitted, and other settings such as data transfer conditions, or the result of data transfer in the communication processing apparatus 210, notification when a device is unpermitted, and other settings such as data transfer conditions. Accordingly, an administrator who manages data transfer from the devices 220 to the servers 230 can easily monitor the data transfer state and can change the settings by a simple operation by using the management server 240.

Note that details of determination performed on a connected device by the device control processor 212 are as follows. For example, when the device is a USB device and the OS of a host apparatus is "Linux", USB device determination is performed by determining whether to permit connection, based on information notified to udev (user space device management) when the USB device is connected. If a USB device whose connection is unpermitted is connected, it is determined that the device is an unpermitted device. Permitted USB devices are registered in a permission rule (permission list) beforehand. On the other hand, when the host OS is Linux, Bluetooth® device determination is performed by periodically checking connections by "hcitool con". If there is an unpermitted connection, it is determined that the device is an unpermitted device. Permitted Bluetooth® connections are registered in a permission whitelist (permission list) beforehand.

<<Communication Processing Apparatus>>

The arrangements and operations of constituent elements of the communication processing apparatus 210 of this example embodiment will be explained below with reference to FIGS. 3A to 6B.

(Communication Processor)

FIG. 3A is a block diagram showing the functional configuration of the communication processor 211 of the communication processing apparatus 210 according to this example embodiment.

The communication processor 211 includes a communication controller 301, a communication process information obtainer 302, a communication process information storing unit 303, and a communication processing table 304. The communication processor 211 further includes a switching information setter 305, a device control information setter 306, an unpermitted device connection receiver 307, and a server disconnection notifier 308.

The communication controller 301 controls communication between the management server 240 and the device control processor 212 and switching unit (SDN) 214 in the communication processing apparatus 210. Note that the communication controller 301 also controls communication with the application 213 and communicator 215 if necessary. The communication process information obtainer 302 obtains communication process information indicating a communication process in the communication processing apparatus 210 from the management server 240. The communication process information storing unit 303 stores the communication process information obtained by the communication process information obtainer 302 in the communication processing table 304. The communication processing table 304 stores the communication process information obtained from the management server 240, and constructs the communication process in the communication processing apparatus 210.

Of the communication process information stored in the communication processing table 304, the switching information setter 305 sets switching information in the openflow controller of the switching unit 214. Note that when the unpermitted device connection receiver 307 receives a notification of the connection of an unpermitted device from the device control processor 212, the switching information setter 305 sets connection information indicating unpermitted device connection, instead of normal switching information, in the openflow controller of the switching unit 214, thereby implementing the process of disconnecting the servers 230.

Of the communication process information stored in the communication processing table 304, the device control information setter 306 sets information such as determination of the connection of an unpermitted device, or the connection of a connected device to the application 213, in the device control processor 212. The unpermitted device connection receiver 307 receives the unpermitted device connection notification, which is determined by using the communication process information for determining the connection of an unpermitted device, from the device control processor 212. Upon receiving the notification of the connection of an unpermitted device, the server disconnection notifier 308 emergently notifies the management server 240 of complete disconnection to the servers 230, and requests the management server 240 to rapidly recover the communication processing apparatus 210 while ensuring the security (safety) even if it is partial.

FIG. 3B is a view showing the arrangement of the communication processing table 304 according to this example embodiment. The communication processing table 304 is a table holding data for controlling the processing of data transfer from a device to a server, in the communication processing apparatus 210.

The communication processing table 304 includes a device registration table 341, an application/server setting table 342, an application registration table 343, and a device connection control table 344. The device registration table 341 stores the interface type of a device and a registration ID as a registered device ID in association with each other, and is used to determine whether a connected device is registered. The application/server setting table 342 stores an application for performing a communication process on data from a registered device, a server as a transfer destination, and a port number for connecting to the server in association with each other, and is used to set data processing from a device and a transfer destination. The application registration table 343 stores an application name and an application ID in association with each other, and is used for data processing and a communication process in the communication processing apparatus 210. The device connection control table 344 defines connection control set from various management servers 240 in accordance with whether a connected device is an unpermitted device or permitted device. In this example embodiment, if an unpermitted device is connected, connection to the servers 230 except the management server 240 of the communication processing apparatus 210 is disconnected, and connections of other permitted devices to the servers 230 are also disconnected. On the other hand, when a permitted device is connected, various connection control operations set from the management server 240 are performed based on the types of device, application, server, and the like.

(Device Processing Controller)

Figure 4A:
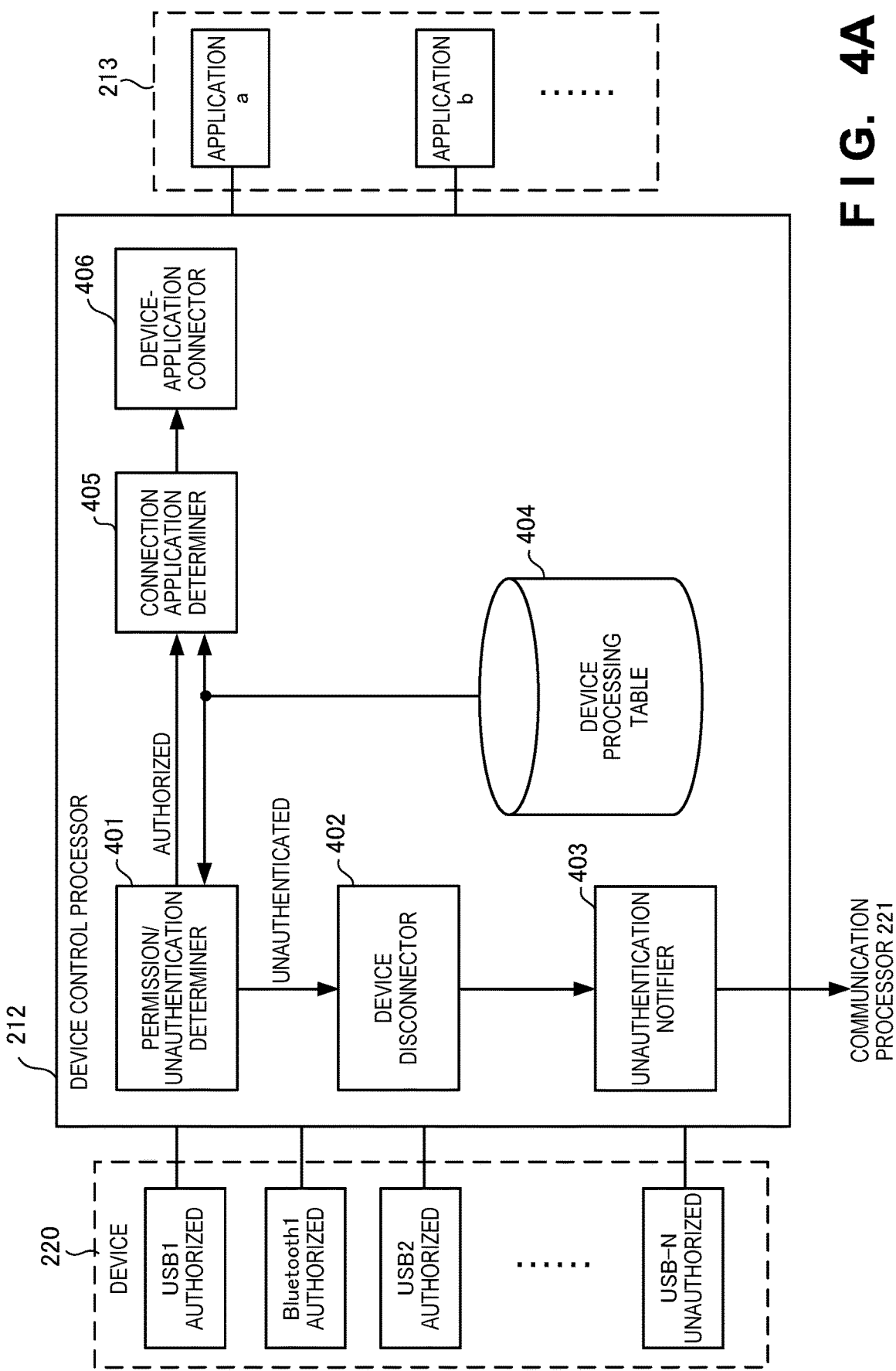
FIG. 4A is a block diagram showing the functional configuration of a device processing controller according to the second example embodiment of the present invention.

FIG. 4A is a block diagram showing the functional configuration of the device control processor 212 of the communication processing apparatus 210 according to this example embodiment.

The device control processor 212 includes a permission/unpermission determiner 401, a device disconnector 402, an unpermission notifier 403, a device processing table 404, a connection application determiner 405, and a device-application connector 406.

The permission/unpermission determiner 401 determines whether a connected device is permitted/unpermitted, based on device registration information set in the device processing table 404. The device disconnector 402 disconnects the connected device if the permission/unpermission determiner 401 determines that the device is unpermitted. When the connected device is disconnected because the device is unpermitted, all connections to the server 230 are disconnected, so the unpermission notifier 403 notifies the management server 240 of this information via the communication processor 211.

The connection application determiner 405 determines the application 213 to which the connected devices 220 are connectable, based on information set in the device processing table 404 and indicating the relationship between the devices 220 and application 213. The device-application connector 406 connects the devices 220 to the application 213 which is found to be connectable by the connection application determiner 405. Note that an application to which the devices 220 are connectable is not limited to one, so it is possible to set a plurality of applications or all applications as connectable applications.

FIG. 4B is a view showing the arrangement of the device processing table 404 according to this example embodiment. The device processing table 404 is used by the device control processor 212 to manage determination of authorization/unpermission of a connected device, and manage connection to the application 213. Note that the same reference numerals as in FIG. 3B denote the same constituent elements in FIG. 4B, and a repetitive explanation thereof will be omitted.

The device processing table 404 has a device-application connection table 442. Note that the device-application connection table 442 is a part of the application/server setting table 342 shown in FIG. 3B, and stores the relation between a device and application.

(Switching Unit)

Figure 5A:
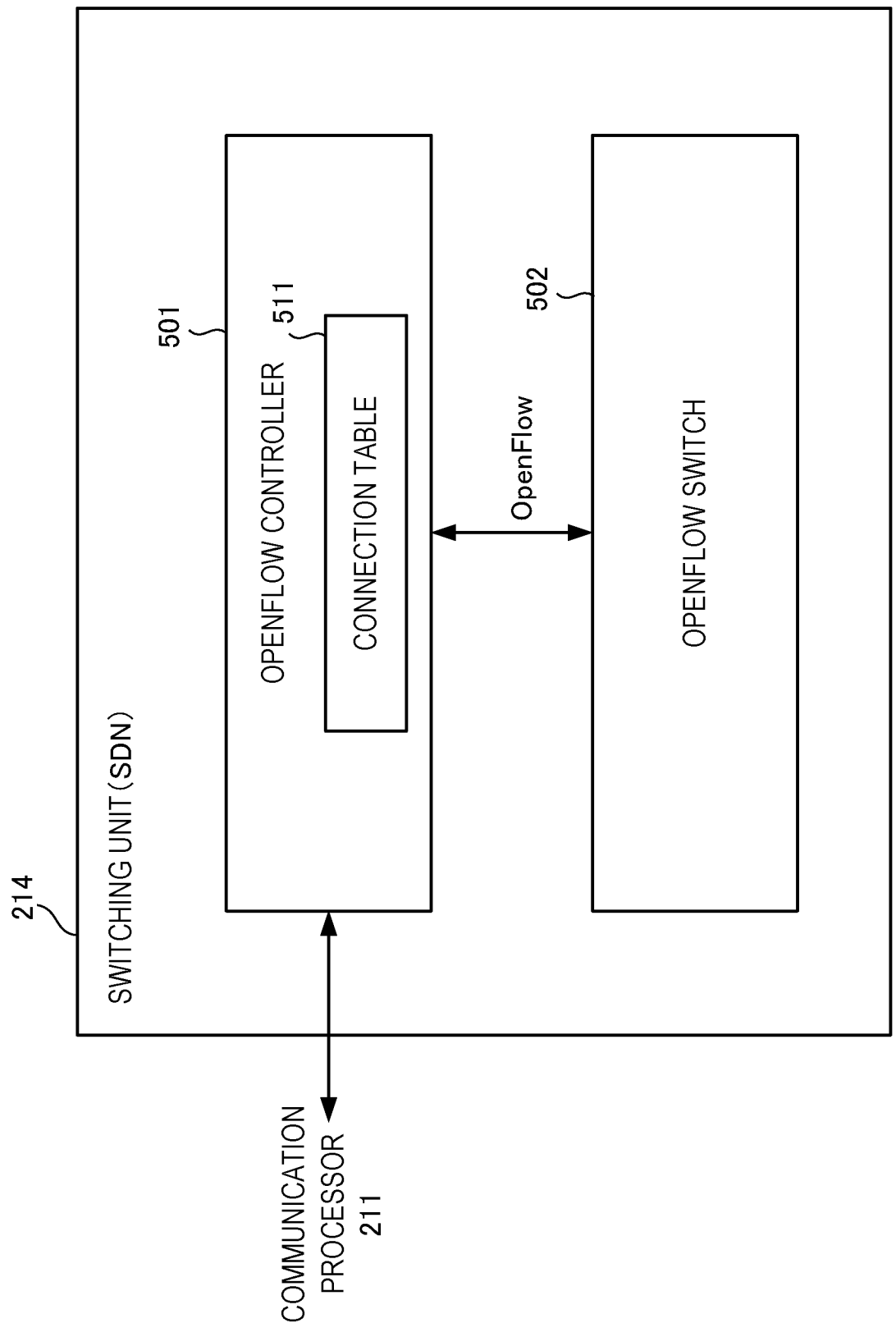
FIG. 5A is a block diagram showing the functional configuration of a switching unit according to the second example embodiment of the present invention.

FIG. 5A is a block diagram showing the functional configuration of the switching unit 214 of the communication processing apparatus 210 according to this example embodiment.

In this example embodiment, the switching unit 214 is an openflow SDN (Software Defined Network), and includes an openflow controller 501 and an openflow switch 502. The openflow controller 501 has a connection table 511, and, in accordance with the connection table 511, generates a flow table to be set in each switch through which data passes. The openflow switch 502 controls the routing of a transmission source and transmission destination in accordance with the flow table set by the openflow controller 501. Note that in this example embodiment, communication disconnection to all servers caused by the connection of an unpermitted device is implemented by, e.g., processing which does not route transmission data from the application 213 to any port connecting to the communicator 215.

FIG. 5B is a view showing the arrangement of the connection table 511 according to this example embodiment. The connection table 511 is used by the openflow controller 501 to generate the flow table.

The connection table 511 includes an application-port connection table 542 and a port connection control table 544. The application-port connection table 542 is a part of the application/server setting table 342 shown in FIG. 3B, and stores the relation between an application and a port to the communicator 215. The port connection control table 544 further stores, in the device connection control table 344 shown in FIG. 3B, an input port from the application 213 and an output port to the communicator 215 for the openflow controller 501.

(Procedure of Communication Processor)

Figure 6A:
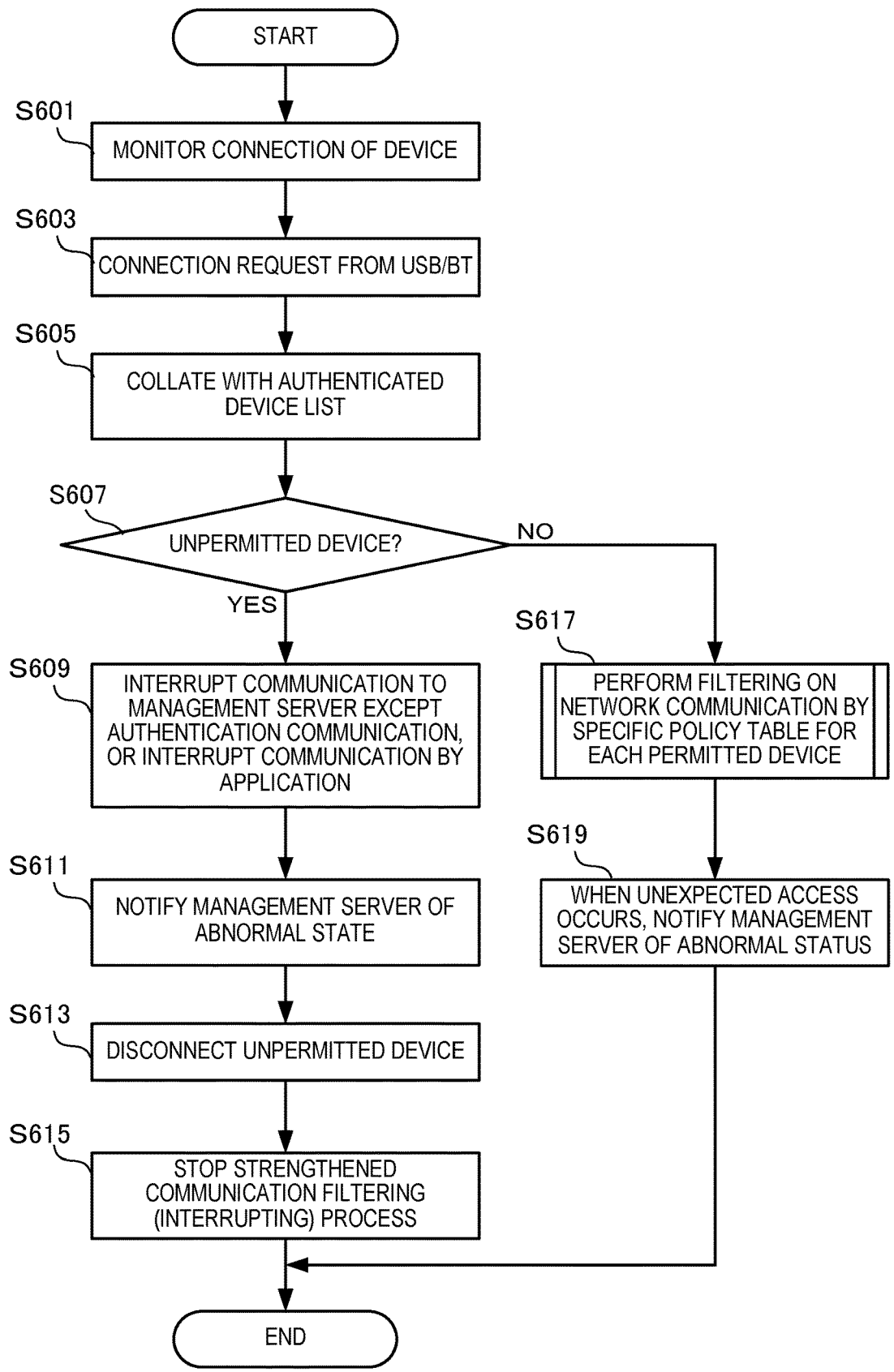
FIG. 6A is a flowchart showing the procedure of the communication processor according to the second example embodiment of the present invention.

FIG. 6A is a flowchart showing the procedure of the communication processor 211 of the communication processing apparatus 210 according to this example embodiment. A CPU (Central Processing Unit) of the communication processing apparatus 210 executes this flowchart by using a memory, and implements the functional configuration of the communication processing apparatus 210. Note that the individual constituent elements of the communication processing apparatus 210 desirably have their own CPUs and implement the functions by communicating with each other. To avoid complication, however, the procedure will be explained by assuming that not the individual constituent elements but the communication processing apparatus 210 performs the procedure.

In step S601, the communication processing apparatus 210 monitors device connection by the device control processor 212. In step S603, the communication processing apparatus 210 receives a connection request from a USB device or Bluetooth® (BT in FIG. 6A) device. In step S605, the communication processing apparatus 210 collates the connected device with a permitted device list (corresponding to the device registration table 341) to determine whether the device is permitted or unpermitted. In step S607, the communication processing apparatus 210 determines whether the device is an unpermitted (unpermitted) device.

If the device is an unpermitted device, the process advances to step S609, and the communication processing apparatus 210 disconnects communication to all the servers 230 except determination communication to the management server 240, or disconnects communication by the application 213. In step S611, the communication processing apparatus 210 notifies the management server 240 of this abnormal state in which communication to all the servers 230 is disconnected. Note that the management server 240 may also monitor the state of the communication processing apparatus 210 at all times and receive information of the abnormal state. In step S613, the communication processing apparatus 210 disconnects the unpermitted device by the device control processor 212.

After that, the communication processing apparatus 210 determines that an obstacle such as an attack does not influence the communication processing system 200, because the unpermitted device is disconnected. In step S615, therefore, the communication processing apparatus 210 stops the strengthened communication filtering (disconnecting) process of disconnecting communication to all the servers 230. In this case, it is also possible to perform the application 213 which processes data of a permitted device, or a process of selectively enabling a connectable server 230. For example, it is possible by simple setting to implement a process of enabling activation of only the application 213 which performs highly confidential processing, or a process of delaying connection to a highly important server in accordance with the importance of data collected by the server.

On the other hand, if the connected device is a permitted device, the process advances to step S617, and the communication processing apparatus 210 performs a filtering process on network communication by a policy table specified for each permitted device. In step S619, the communication processing apparatus 210 notifies the management server 240 of an abnormal status if an unexpected access occurs. Note that the management server 240 may also monitor the state of the communication processing apparatus 210 at all times and receive information of the abnormal status in this processing as well.

FIG. 6B is a flowchart showing the procedure of the filtering process (step S617) according to this example embodiment. Note that FIG. 6B shows examples of two filtering processes (step S617), but it is also possible to use other combinations, other filtering processes, or a combination with another filtering process.

In step S621, the communication processing apparatus 210 refers to a communication policy setting table of permitted device (equivalent to the application/server setting table 342 shown in FIG. 3B). In step S623, the communication processing apparatus 210 limits servers accessible from, e.g., a specific USB/Bluetooth® device.

Also, in step S631, the communication processing apparatus 210 refers to a communication policy setting table of permitted devices and used communication applications (equivalent to the application/server setting table 342 shown in FIG. 3B). In step S623, the communication processing apparatus 210 limits communication by an application to be used by a specific USB/Bluetooth® device.

<<Connection State of Communication Processing System>>

Various connection states based on the communication policy of the communication processing apparatus 210 of this example embodiment will be explained below with reference to FIGS. 7A to 8B.

(Unpermitted Device)

Figure 7A:
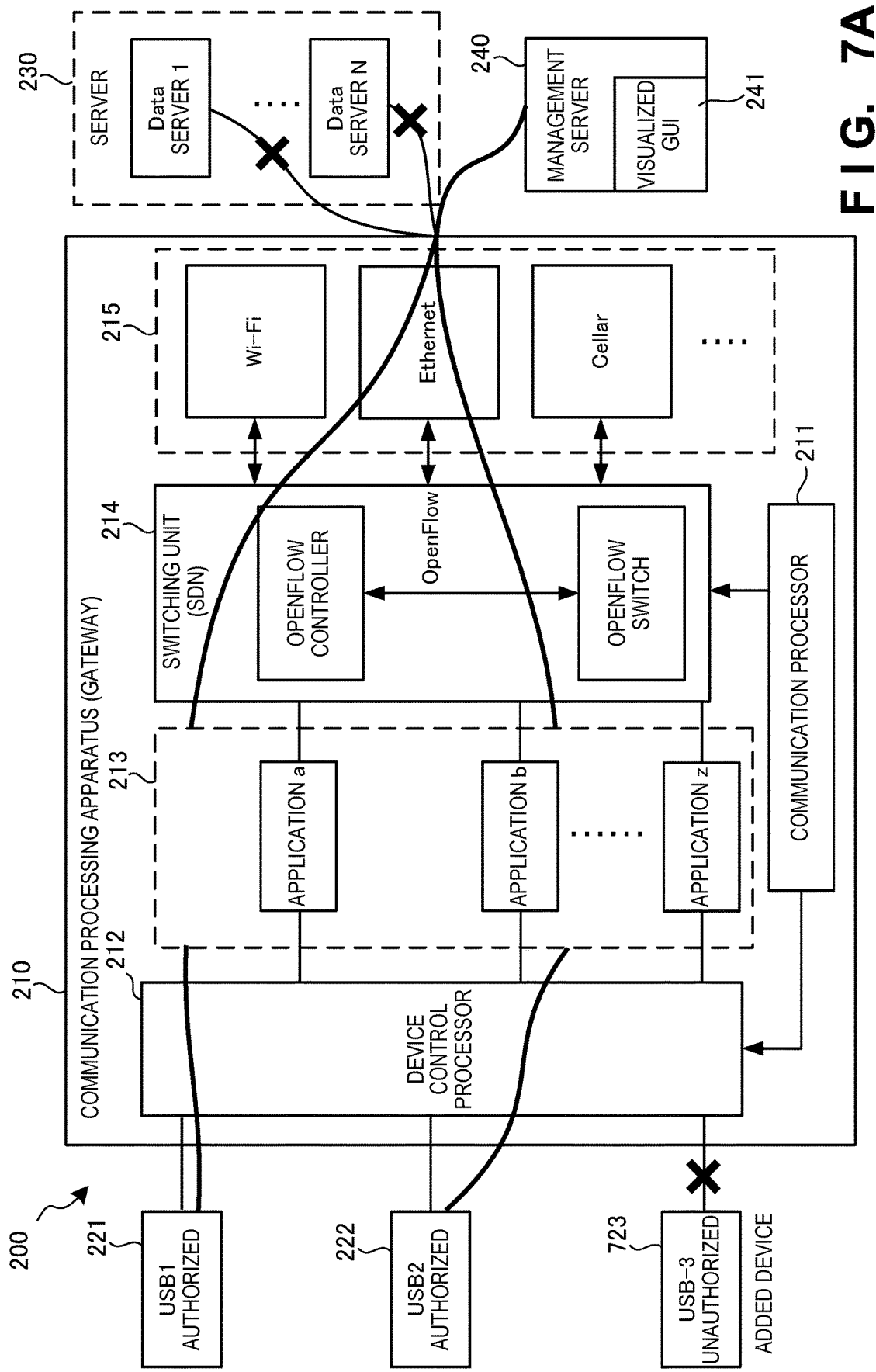
FIG. 7A is a view showing the connection state of the communication processing system with respect to an unpermitted device according to the second example embodiment of the present invention.

FIG. 7A is a view showing the connection state of the communication processing system 200 with respect to an unpermitted device according to this example embodiment. FIG. 7A shows a connecting process when an unpermitted device 723 is connected.

When the device control processor 212 determines that the unpermitted device 723 is connected, communications to all the servers 230 except the management server 240 are disconnected in accordance with the communication policy of this example embodiment. In addition, the unpermitted device 723 is disconnected. Then, the connected management server 240 is emergently notified that communications to all the servers 230 are disconnected. This processing based on the communication policy of this example embodiment disconnects data transmissions from permitted devices 221 and 222 to the servers 230 as well, but can prevent damage from being inflicted on the servers 230 by an attack from the unpermitted device 723.

Figure 7B:
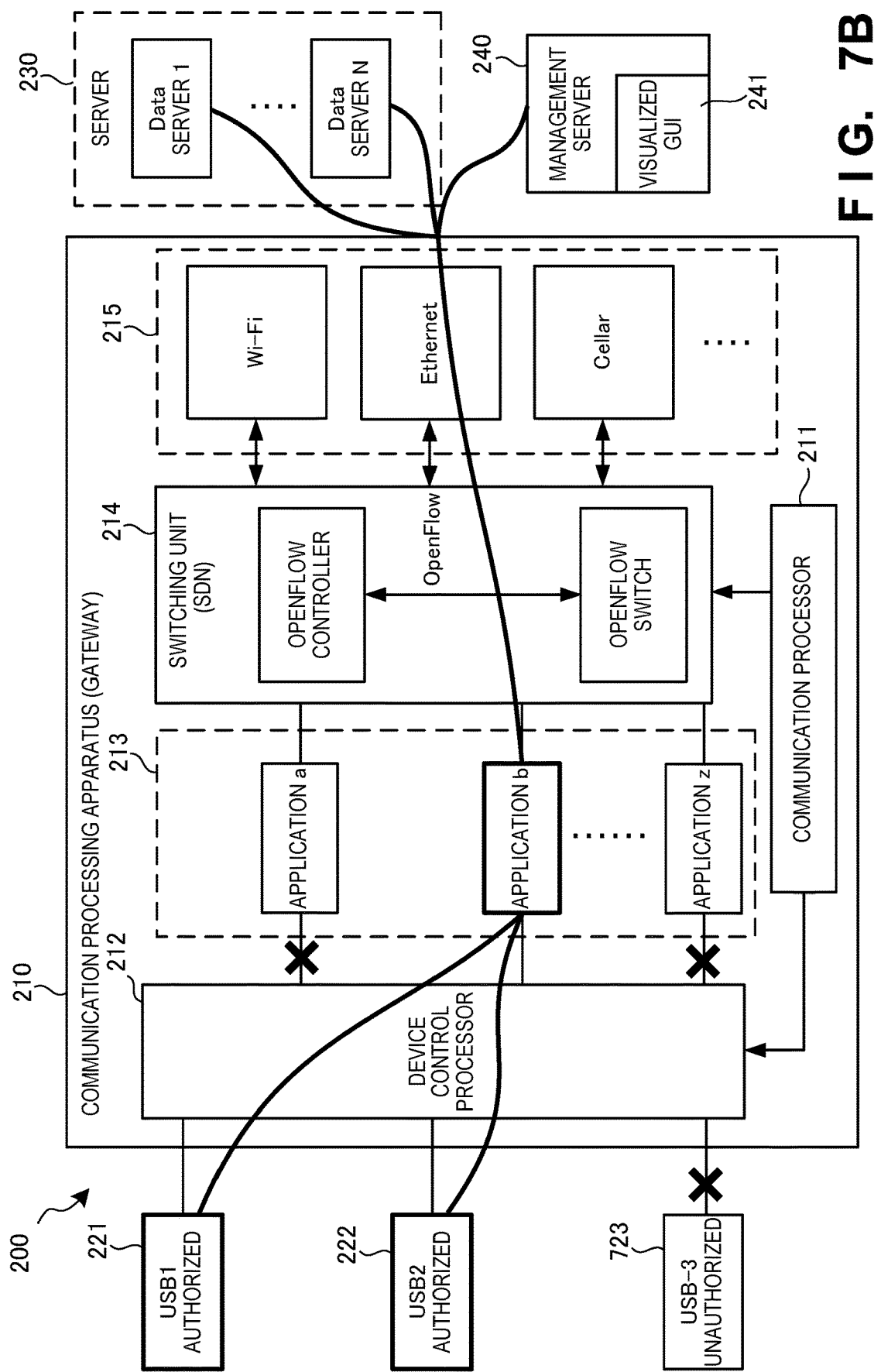
FIG. 7B is a view showing the connection state of the communication processing system upon resumption after disconnection according to the second example embodiment of the present invention.

FIG. 7B is a view showing the connection state of the communication processing system 200 when the operation is resumed after disconnection according to this example embodiment. FIG. 7B shows a reconnecting process after the unpermitted device 723 is disconnected. Referring to FIG. 7B, the use of communication applications (a) and (b) having low confidentiality is limited.

The management server 240 determines that no obstacle is inflicted on it because the unpermitted device 723 is disconnected as shown in FIG. 7A, and rapidly restores data transmissions from the permitted devices 221 and 222 to the servers 230. However, the possibility that a problem arises if the communication application (a) or (b) having low confidentiality is used still remains. Therefore, the management server 240 performs setting so as to prevent the use of the lowly confidential communication applications (a) and (b) in accordance with the communication policy of this example embodiment.

Note that as described above, it is possible to limit the use of an application, and it is also possible to limit connection to the server 230 which is heavily damaged if an obstacle is inflicted on it.

(Permitted Device)

Figure 8A:
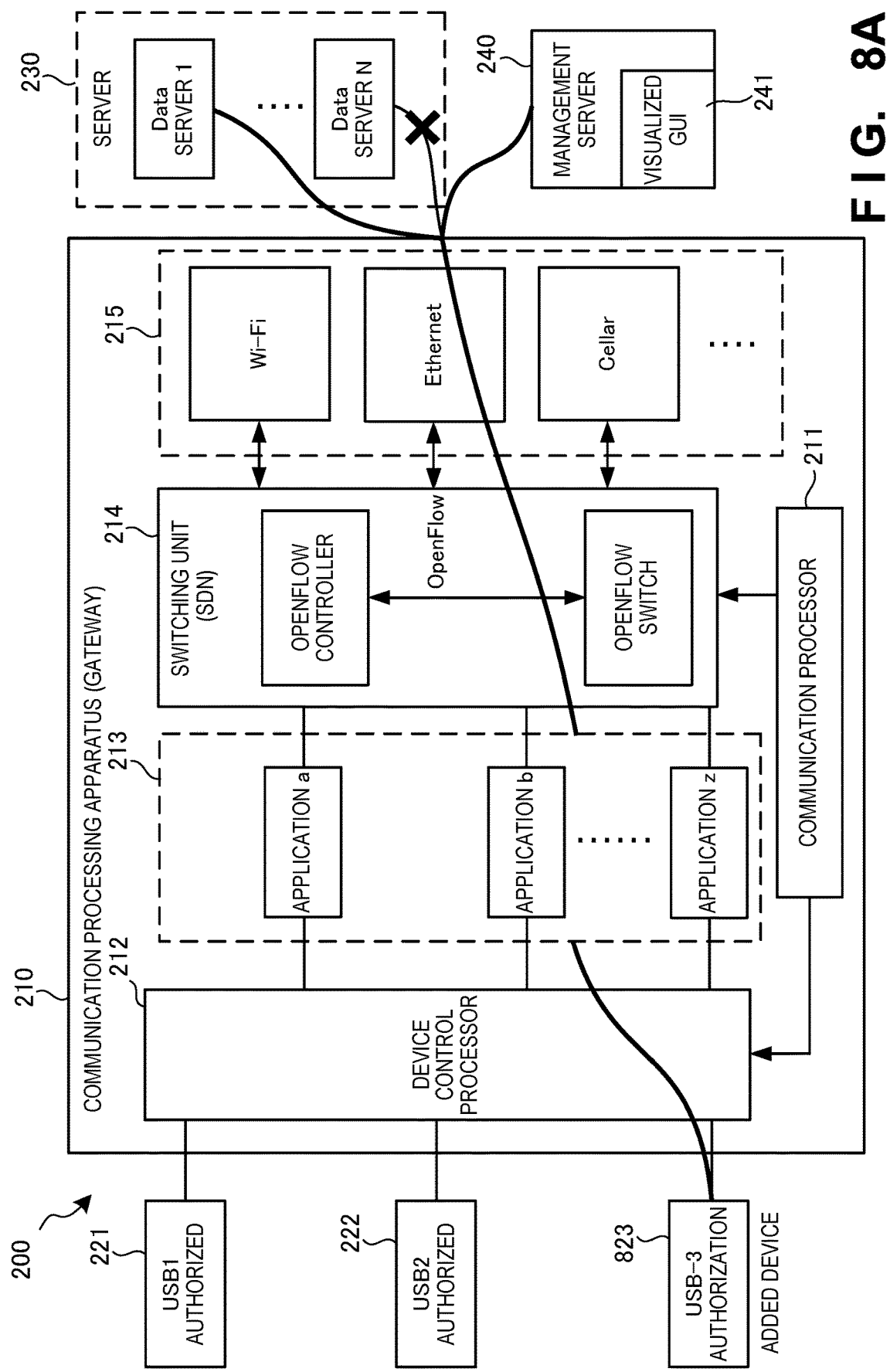
FIG. 8A is a view showing the connection state of the communication processing system with respect to a permitted device according to the second example embodiment of the present invention.

FIG. 8A is a view showing the connection state of the communication processing system 200 with respect to a permitted device according to this example embodiment. FIG. 8A shows a connection state when a connected device 823 is a permitted device.

When the device control processor 212 determines that the permitted device 823 is connected, all the applications 213 are usable, but a server to which the device 823 can connect and transmit data is selected, in accordance with the communication policy associated with the device 823. For example, the permitted device 823 is not connected to a server which does not require data of the device 823, and is not connected to a specific server if, for example, the data reliability of the permitted device 823 is low. In this case, the openflow controller of the switching unit (SDN) 214 performs setting so as to connect the input ports from all the applications to only the output port to the selected server.

Figure 8B:
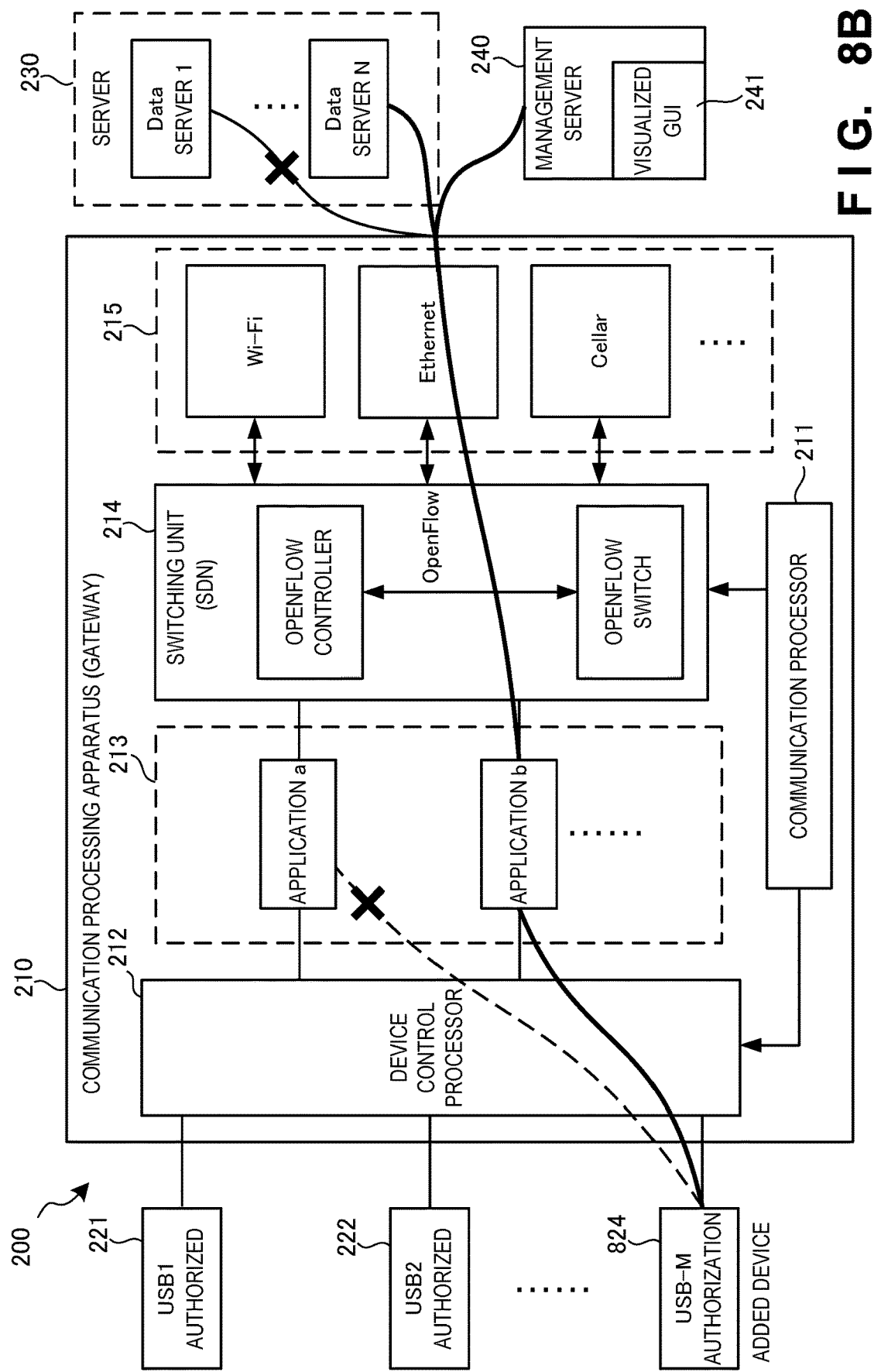
FIG. 8B is a view showing another connection state of the communication processing system with respect to a permitted device according to the second example embodiment of the present invention.

FIG. 8B is a view showing another connection state of the communication processing system 200 with respect to a permitted device according to this example embodiment. FIG. 8B shows a case in which applications to be used by a permitted device 824 are limited.

According to the communication policy associated with the permitted device 824, the application (b) is usable but the application (a) is not usable, and a server to which the device 824 can connect and transfer data is also selected. In this case, the usable application and connectable server can independently be set, but the communication policies are combined if the application and server are related. For example, if the processing of an application is not confidential, transmission to a server having important data is limited.

Note that the communication policies shown in FIGS. 7A to 8B are merely portions of this example embodiment, and various policies and their combinations can be set.

<<Management Server>>

The arrangement and operation of the management server 240 will be explained below with reference to FIGS. 9A to 10D.

(Functional Configuration of Management Server)

FIG. 9A is a block diagram showing the functional configuration of the management server 240 according to this example embodiment.

The management server 240 includes a communication controller 901, a gateway processing table setter 902, a gateway management database 903, a gateway processing obtainer 904, and a gateway status obtainer 905. The management server 240 also includes an operation unit 906 and a display 907.

The communication controller 901 controls communication to the communication processing apparatus 210. When the management server 240 is connected to an operation PC and remotely operated, the communication controller 901 controls communication to this operation PC. The gateway processing table setter 902 sets, in the communication processing apparatus 210, a gateway processing table corresponding to communication control of each gateway stored in the gateway management database 903. This gateway processing table is equivalent to the communication processing table 304 shown in FIG. 3A. The gateway management database 903 stores the gateway processing table of each gateway to be managed by the management server 240, in association with the gateway ID. The gateway management database 903 also stores processing information and status information transmitted from the communication processing apparatus 210, in association with the gateway ID.

The gateway processing obtainer 904 obtains the log of the communication process from the communication processing apparatus 210. The gateway status obtainer 905 obtains the status of the communication processing apparatus 210. Note that the gateway status obtainer 905 can also obtain the emergent notification of all server disconnection caused by the connection of an unpermitted device, which is transmitted from the communication processing apparatus 210 to the management server 240. Note that this emergent notification of all server disconnection may also be an interrupt different from a normal status notification.

On the operation unit 906, the user performs an operation of setting data to be stored in the gateway management database 903 so as to be set in the communication processing apparatus 210, or a changing operation, deleting operation, and the like. On the operation unit 906, the user also sets a permitted device and permitted application while monitoring a menu displayed on the display 907. The display 907 displays data to be stored in the gateway management database 903 so as to be set in the communication processing apparatus 210, displays already stored data, and displays the emergent notification of all server disconnection. Note that an operation PC may also replace the operation unit 906 and display 907.

Note also that when the management server 240 controls communication connection in the communication processing apparatus 210 as a gateway, the management server 240 includes a functional constituent unit equivalent to the communication processor 211 shown in FIG. 2, and controls each of functional constituent units of the communication processing apparatus 210, or the management server 240 may be included in the communication processing apparatus 210.

Figure 9B:
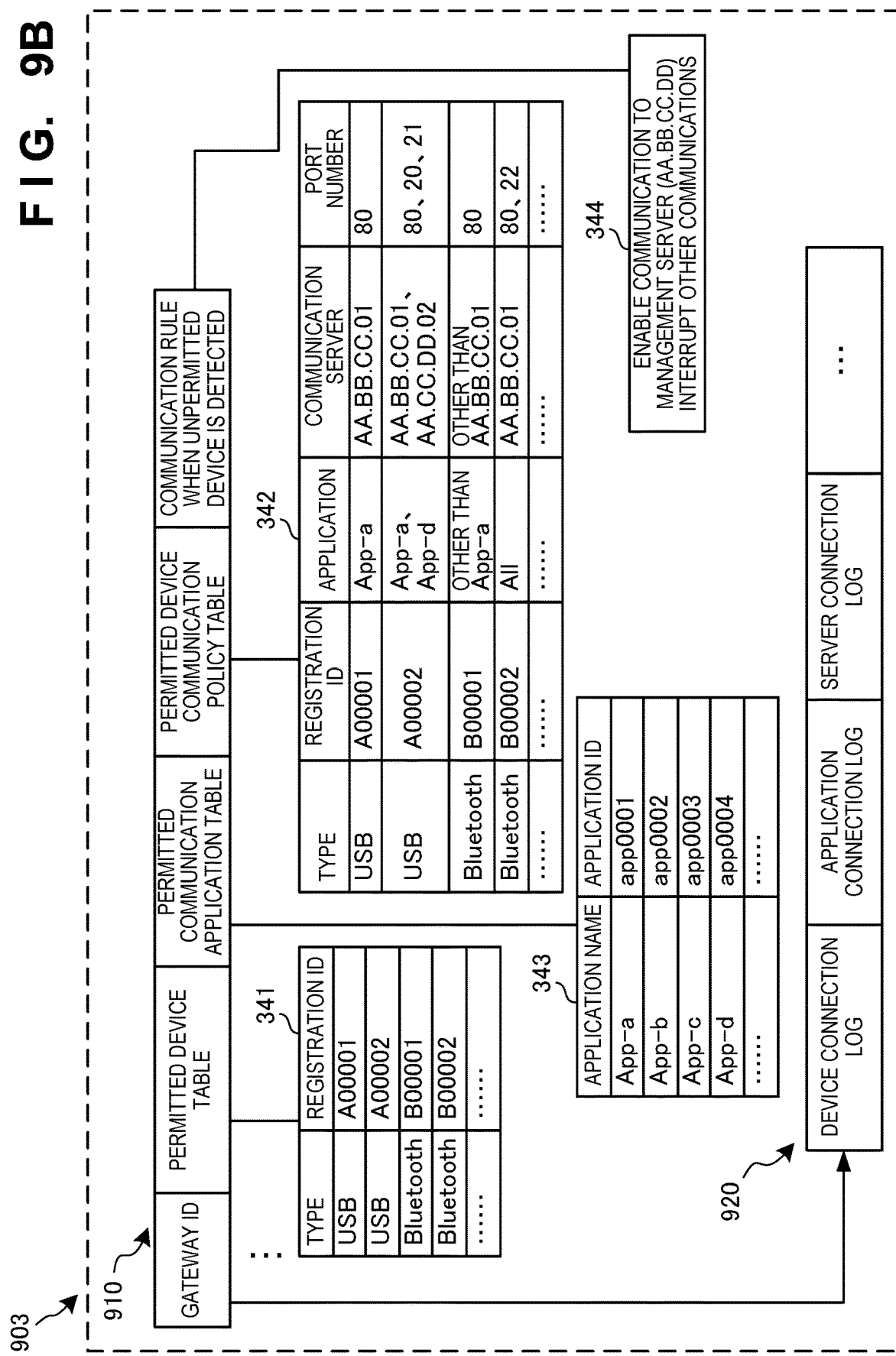
FIG. 9B is a view showing the arrangement of a gateway management database according to the second example embodiment of the present invention.

FIG. 9B is a view showing the arrangement of the gateway management database 903 according to this example embodiment. Note that the same reference numerals as in FIG. 3B denote the same constituent elements in FIG. 9B, and an explanation thereof will be omitted.

Referring to FIG. 9B, a gateway management table 910 stores the tables 341 to 344 shown in FIG. 3B in association with the gateway IDs. The tables 341 to 344 have been described above with reference to FIG. 3B, so a repetitive explanation thereof will be omitted. Also, a gateway log table 920 stores a device connection log, application connection log, and server connection log in association with each gateway ID.

<<Visualized Management Monitor>>

Figure 10A:
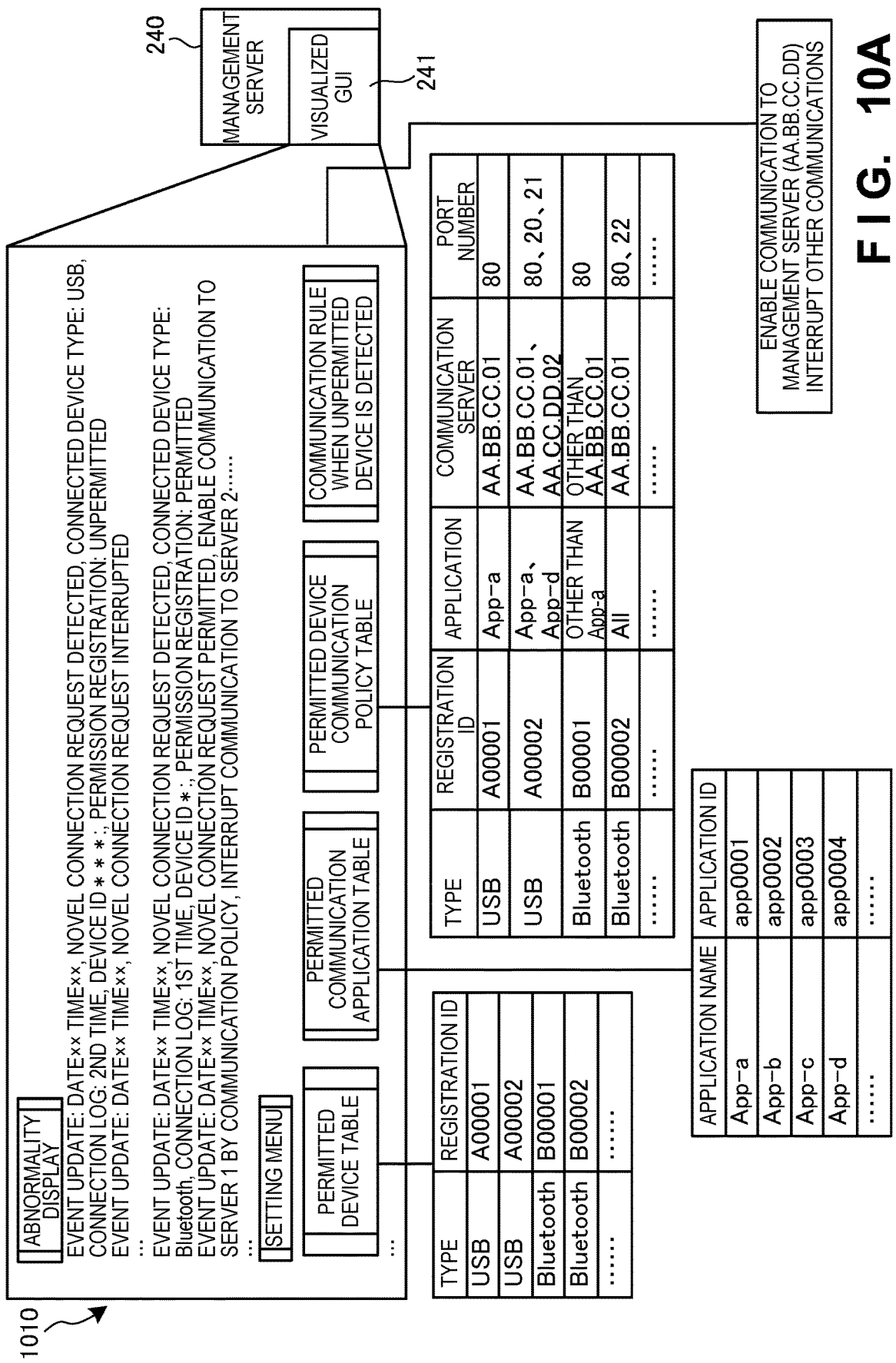
FIG. 10A is a view showing the concept of a visualized management monitor according to the second example embodiment of the present invention.

FIG. 10A is a view showing the concept of a visualized management monitor according to this example embodiment.

On a display screen 1010 shown in FIG. 10A, the display 907 displays events having occurred in time series as abnormality display. The display screen 1010 also displays the types of gateway management tables to be stored in the gateway management database 903 as setting menus. By selecting these setting menus, present setting information is linked and displayed. This setting information can be added, changed, and deleted by input instructions from the operation unit 906.

(Settings of Applications)

Figure 10B:
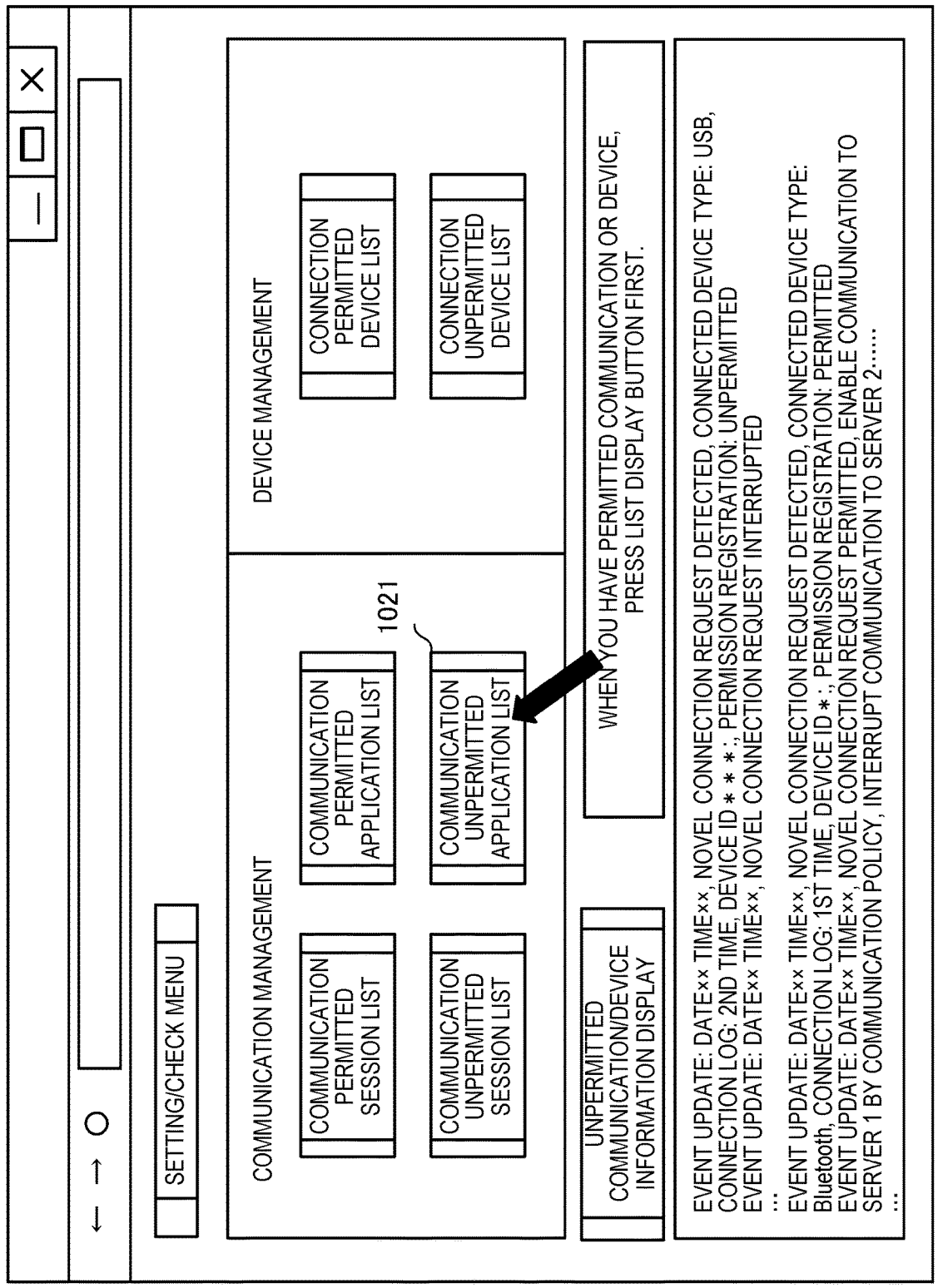
FIG. 10B is a view showing a display screen example of the visualized management monitor according to the second example embodiment of the present invention.
Figure 10D:
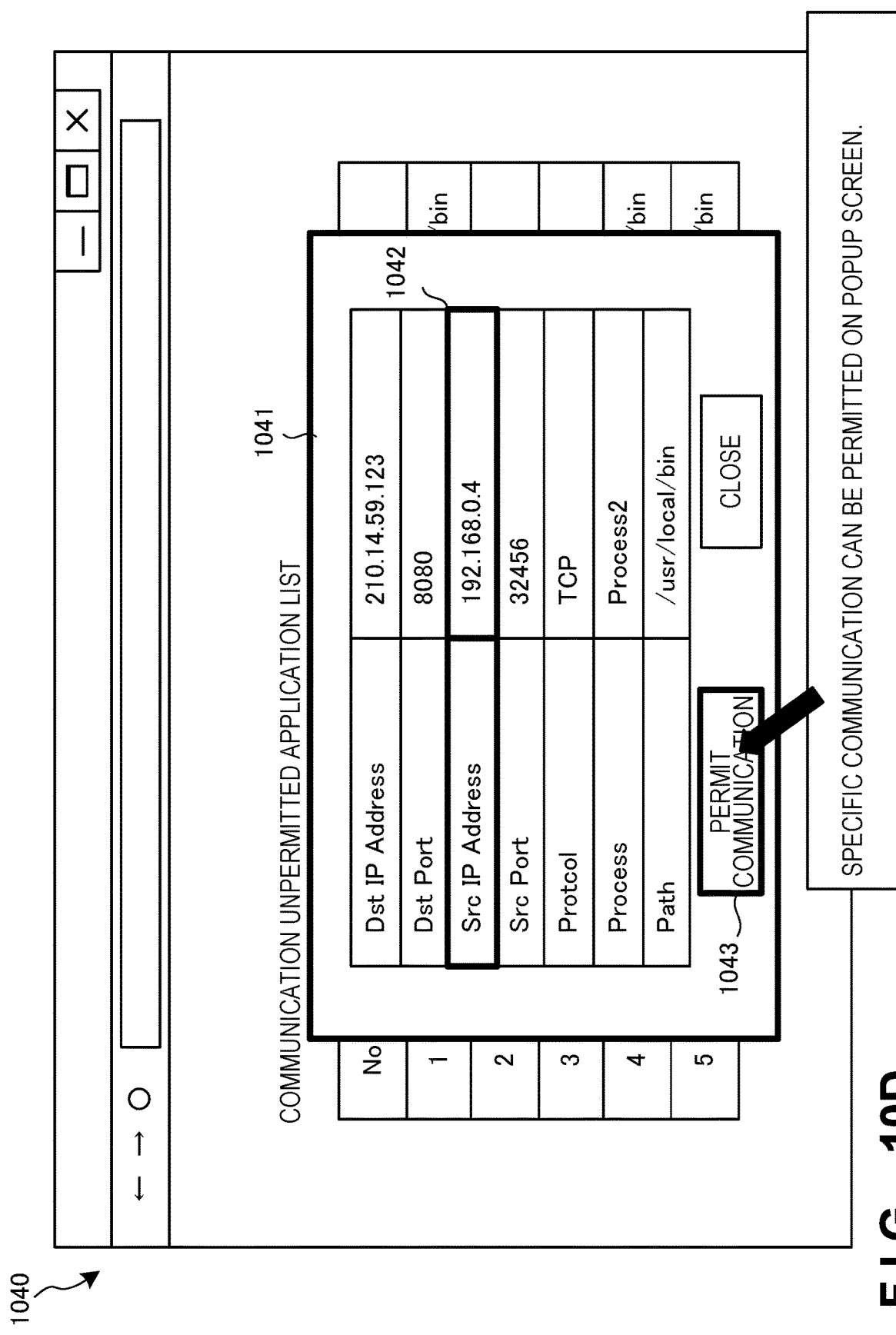
FIG. 10D is a view showing a display screen example of the visualized management monitor according to the second example embodiment of the present invention.

FIGS. 10B to 10D are views showing display screen examples of a visualized monitor according to this example embodiment. Note that the application settings shown in FIGS. 10B to 10D are examples showing the way the visualized management monitor increases the speed and efficiency of processing. Therefore, it is obviously possible to increase the speed and efficiency of processing by other settings and changes, or monitoring and prevention.

FIG. 10B is a view showing a display screen 1020 of various settings/check menus. When the user selects a communication unpermitted application list menu 1021 on the display screen 1020 shown in FIG. 10B, a display screen 1030 of a communication unpermitted application list shown in FIG. 10C is displayed.

When the user clicks a target row 1031 for permitting communication on the display screen 1030 of a communication unpermitted application list shown in FIG. 10C, a popup window 1041 appears as indicated on a display screen 1040 shown in FIG. 10D.

The user can permit specific communication by selecting specific communication 1042 as a permission target and selecting communication permission 1043 on the popup display 1041 shown in FIG. 10D.

In this example embodiment, when it is determined that device connection is not permitted, or when it is determined that device connection is permitted, the connection between the device and server can variously be controlled in accordance with the status. This makes it possible to flexibly secure a safe connection from the device to the server (cloud).

In addition, the connection of an application for controlling the device can variously be controlled in accordance with the status. Consequently, a safe connection can be secured from the device to the server (cloud) by more appropriate control.

Furthermore, a GUI (Graphical User Interface) of the management server visualizes communication from the device to the network. This makes it possible to deal with a network threat and increase the speed and efficiency of management. When disconnecting all network connections to the server, a delay of management can be prevented by performing emergent notification to the management server.

That is, even when a non-IP USB/Bluetooth® device is connected, a safe connection can be secured from the device to the cloud by controlling the device and network communication. Also, the presence/absence of a permitted device is determined by collation with the device permission list. Furthermore, the security of the device and network is improved by a fine communication filtering process performed by a network communication control process (terminal openflow) on the host side.

Other Example Embodiments

While the invention has been particularly shown and described with reference to example embodiments thereof, the invention is not limited to these example embodiments. It will be understood by those of ordinary skill in the art that various changes in form and details may be made therein without departing from the spirit and scope of the present invention as defined by the claims.

The present invention is applicable to a system including a plurality of devices or a single apparatus. The present invention is also applicable even when an information processing program for implementing the functions of the example embodiments is supplied to the system or apparatus directly or from a remote site. Hence, the present invention also incorporates the program installed in a computer to implement the functions of the present invention by the computer, a medium storing the program, and a WWW (World Wide Web) server that causes a user to download the program. Especially, the present invention incorporates at least a non-transitory computer readable medium storing a program that causes a computer to execute processing steps included in the above-described example embodiments.

[Other Expressions of Example Embodiments]

Some or all of the above-described example embodiments can also be described as in the following supplementary notes but are not limited to the followings.

(Supplementary Note 1)

There is provided a communication processing apparatus comprising:

a first connection unit that connects devices;

a second connection unit that connects to servers;

a switching unit that switches connections of said devices and said servers between said first connection unit and said second connection unit;

a determiner that determines whether connection of a device to said first connection unit is permitted or unpermitted; and a connection controller that controls said switching unit in accordance with a determination result from said determiner.

(Supplementary Note 2)

There is provided the communication processing apparatus according to supplementary note 1, wherein said connection controller controls said switching unit to disconnect between said servers and all devices connected to said first connection unit, if said determiner determines that connection of the device is unpermitted.

(Supplementary Note 3)

There is provided the communication processing apparatus according to supplementary note 1 or 2, wherein said connection controller controls said switching unit to restore connections of said servers and all devices connected to said first connection unit except the device, when said first connection unit disconnects the device whose connection is unpermitted.

(Supplementary Note 4)

There is provided the communication processing apparatus according to any one of supplementary notes 1 to 3, wherein said connection controller controls said switching unit to limit connections of the device and said servers, even if said determiner determines that connection of the device is permitted.

(Supplementary Note 5)

There is provided the communication processing apparatus according to any one of supplementary notes 1 to 4, further comprising a provider that provides application processing for said devices connected to said first connection unit, wherein said connection controller controls said switching unit to limit application processing to be provided for said devices.

(Supplementary Note 6)

There is provided the communication processing apparatus according to any one of supplementary notes 1 to 5, wherein said switching unit is a software-controlled virtual network.

(Supplementary Note 7)

There is provided the communication processing apparatus according to any one of supplementary notes 1 to 6, wherein said connection controller controls said switching unit in accordance with setting by an external communication managing apparatus that manages communication, and said connection controller notifies said external communication managing apparatus of at least connection states of said devices and said servers.

(Supplementary Note 8)

There is provided the communication processing apparatus according to supplementary note 7, wherein said connection controller emergently notifies said external communication managing apparatus of disconnection between all devices and said servers by said second connection unit.

(Supplementary Note 9)

There is provided a method of controlling a communication processing apparatus, the method comprising:

causing a switching unit to switch connections of devices and servers, between a first connection unit that connects the devices and a second connection unit that connects to the servers;

determining whether connection of a device to the first connection unit is permitted or unpermitted; and controlling the switching unit in accordance with a determination result in the determining step.

(Supplementary Note 10)

There is provided a program of controlling a communication processing apparatus, that causes a computer to execute a method, comprising:

causing a switching unit to switch connections of devices and servers, between a first connection unit that connects the devices and a second connection unit that connects to the servers;

determining whether connection of a device to the first connection unit is permitted or unpermitted; and controlling the switching unit in accordance with a determination result in the determining step.

(Supplementary Note 11)

There is provided a communication managing apparatus comprising:

a holder that holds connection information containing a condition for determining whether each of connections of devices is permitted or unpermitted and connections of the devices to servers;

a setter that sets the connection information in a connection controller of a communication processing apparatus, said connection controller controlling connection between a first connection unit that connects the devices and a second connection unit that connects to the servers;

an obtainer that obtains connection states by said connection controller based on the connection information; and a presenter that presents the obtained connection states.

(Supplementary Note 12)

There is provided a method of controlling a communication managing apparatus, the method comprising:

causing a holder to hold connection information containing a condition for determining whether each of connections of devices is permitted or unpermitted and connections of the devices to servers;

setting the connection information in a connection controller of a communication processing apparatus, the connection controller controlling connection between a first connection unit that connects the devices and a second connection unit that connects to the servers;

obtaining connection states by the connection controller based on the connection information; and presenting the obtained connection states.

(Supplementary Note 13)

There is provided a program of controlling a communication managing apparatus, that causes a computer to execute a method, comprising:

causing a holder to hold connection information containing a condition for determining whether each of connections of devices is permitted or unpermitted and connections of the devices to servers;

setting the connection information in a connection controller of a communication processing apparatus, the connection controller controlling connection between a first connection unit that connects the devices and a second connection unit that connects to the servers;

obtaining connection states by the connection controller based on the connection information; and presenting the obtained connection states.

(Supplementary Note 14)

There is provided a communication processing system comprising:

a holder that holds connection information containing a condition for determining whether each of connections of devices is permitted or unpermitted and connections of the devices to servers;

a switching unit that switches the connections of the devices and the servers between a first connection unit that connects the devices and a second connection unit that connects to the servers;

a determiner that determines whether connection of a device to said first connection unit is permitted or unpermitted, in accordance with the connection information; and a connection controller that controls said switching unit based on the connection information, in accordance with a determination result from said determiner.

(Supplementary Note 15)

There is provided a communication processing method comprising:

causing a holder to hold connection information containing a condition for determining whether each of connections of devices is permitted and connections of the devices to servers;

causing a switching unit to switch connections of the devices and the servers between a first connection unit that connects the devices and a second connection unit that connects to the servers;

determining whether connection of a device to the first connection unit is permitted or unpermitted, in accordance with the connection information; and controlling the switching unit based on the connection information, in accordance with a determination result in the determining step.

a first connector that connects a device;

a second connector that connects to a server;

a switching unit that switches connections of the device and the server between the first connector and the second connector;

a determiner that determines whether connection of the device to the first connector is permitted; and a connection controller that controls the switching unit in accordance with a determination result from the determiner.

(Supplementary Note 2)

There is provided the communication processing apparatus according to supplementary note 1, wherein if the determiner determines that connection of the device is not permitted, the connection controller controls the switching unit to disconnect the server from all devices connected to the first connector.

(Supplementary Note 3)

There is provided the communication processing apparatus according to supplementary note 1 or 2, wherein when the first connector is disconnected from a device whose connection is found to be unpermitted, the connection controller controls the switching unit to restore connections of the server and all devices connected to the first connector except the device.

(Supplementary Note 4)

There is provided a communication processing apparatus according to any one of supplementary notes 1 to 3, wherein even if the determiner determines that connection of the device is permitted, the connection controller controls the switching unit to limit connection of the device and the server.

(Supplementary Note 5)

There is provided a communication processing apparatus according to any one of supplementary notes 1 to 4, further comprising a provider that provides application processing for the device connected to the first connector, wherein the connection controller controls the switching unit to limit application processing to be provided for the device.

(Supplementary Note 6)

There is provided a communication processing apparatus according to any one of supplementary notes 1 to 5, wherein the switching unit is a software-controlled virtual network.

(Supplementary Note 7)

There is provided a communication processing apparatus according to any one of supplementary notes 1 to 6, wherein the connection controller controls the switching unit in accordance with setting by an external communication managing apparatus that manages communication, and the connection controller notifies the external communication managing apparatus of at least a connection state of the device and the server.

(Supplementary Note 8)

There is provided the communication processing apparatus according to supplementary note 7, wherein the connection controller emergently notifies the external communication managing apparatus of disconnection of all devices from the server by the second connector.

(Supplementary Note 9)

There is provided a communication processing apparatus control method comprising:

causing a switching unit to switch connections of a device and a server, between a first connector that connects the device and a second connector that connects to the server;

determining whether connection of the device to the first connector is permitted; and controlling the switching unit in accordance with a determination result in the determining.

(Supplementary Note 10)

There is provided a communication processing apparatus control program that causes a computer to execute a method, comprising:

causing a switching unit to switch connections of a device and a server, between a first connector that connects the device and a second connector that connects to the server;

determining whether connection of the device to the first connector is permitted; and controlling the switching unit in accordance with a determination result in the determining.

(Supplementary Note 11)

There is provided a communication managing apparatus comprising:

a holder that holds connection information containing a condition for determining whether connection of a device is permitted and a connection of the device to a server;

a setter that sets the connection information in a connection controller of a communication processing apparatus, the connection controller controlling connection between a first connector that connects the device and a second connector that connects to the server;

an obtainer that obtains a connection state obtained by the connection controller based on the connection information; and a presenter that presents the obtained connection state.

(Supplementary Note 12)

There is provided a communication managing apparatus control method comprising:

causing a holder to hold connection information containing a condition for determining whether connection of a device is permitted and a connection of the device to a server;

setting the connection information in a connection controller of a communication processing apparatus, the connection controller controlling connection between a first connector that connects the device and a second connector that connects to the server;

obtaining a connection state obtained by the connection controller based on the connection information; and presenting the obtained connection state.

(Supplementary Note 13)

There is provided a communication managing apparatus control program that causes a computer to execute a method, comprising:

causing a holder to hold connection information containing a condition for determining whether connection of a device is permitted and a connection of the device to a server;

setting the connection information in a connection controller of a communication processing apparatus, the connection controller controlling connection between a first connector that connects the device and a second connector that connects to the server;

obtaining a connection state obtained by the connection controller based on the connection information; and presenting the obtained connection state.

(Supplementary Note 14)

There is provided a communication processing system comprising:

a holder that holds connection information containing a condition for determining whether connection of a device is permitted and a connection of the device to a server;

a switching unit that switches connections of the device and the server between a first connector that connects the device and a second connector that connects to the server;

a determiner that determines whether connection of the device to the first connector is permitted, in accordance with the connection information; and a connection controller that controls the switching unit based on the connection information, in accordance with a determination result from the determiner.

(Supplementary Note 15)

There is provided a communication processing method comprising:

causing a holder to hold connection information containing a condition for determining whether connection of a device is permitted and a connection of the device to a server;

causing a switching unit to switch connections of the device and the server between a first connector that connects the device and a second connector that connects to the server;

determining whether connection of the device to the first connector is permitted, in accordance with the connection information; and controlling the switching unit based on the connection information, in accordance with a determination result in the determining.

The invention claimed is:

1. A communication processing apparatus comprising:
a first connection unit that connects devices;
a second connection unit that connects to a server;
a switching unit that switches connections of the devices and the server between said first connection unit and said second connection unit;
a determiner that determines whether each of the devices is permitted or unpermitted to connect to the communication processing apparatus; and
a connection controller that controls said switching unit in accordance with a determination result from said determiner,
wherein said connection controller controls said switching unit to disconnect between the server and all of the devices connected to said first connection unit, when said determiner has determined that a device is unpermitted to connect to the communication processing apparatus, and then restore connections of the server and other devices connected to said first connection unit except the unpermitted device, after said first connection unit has disconnected the unpermitted device.

2. The communication processing apparatus according to claim 1, wherein said second connection unit connects a plurality of servers,
said connection controller controls said switching unit to disconnect between all of the servers connected to said second connection unit and all of the devices connected to said first connection unit, when said determiner has determined that a device is unpermitted to connect to the communication processing apparatus, and then restore connections of the servers and other devices connected to said first connection unit except the unpermitted device, after said first connection unit has disconnected the unpermitted device.

3. The communication processing apparatus according to claim 2, wherein said connection controller controls said switching unit to limit connections of the devices and the servers, even if said determiner determines that the devices are permitted to connect to the communication processing apparatus.

4. The communication processing apparatus according to claim 3, further comprising a provider that provides application processing for said devices connected to said first connection unit,
wherein said connection controller controls said switching unit to limit application processing to be provided for said devices.

5. The communication processing apparatus according to claim 2, wherein said connection controller controls said switching unit in accordance with setting by an external communication managing apparatus that manages communication, and said connection controller notifies said external communication managing apparatus of at least connection states of the devices and the servers.

6. The communication processing apparatus according to claim 5, wherein said connection controller emergently notifies said external communication managing apparatus of disconnection between all of the devices and all of the servers by said second connection unit.

7. The communication processing apparatus according to claim 1, wherein said switching unit is a software-controlled virtual network.

8. The communication processing apparatus according to claim 1, further comprising a communication manager that manages a control of said switching unit by said connection controller.

9. The communication processing apparatus according to claim 8, wherein the communication manager comprising:
  a holder that holds connection information including a condition for determining whether each of devices is permitted or unpermitted to connect to the communication processing apparatus and communication paths from the devices to servers;
  a setter that sets the connection information in a connection controller of the communication processing apparatus, said connection controller controlling connection between the first connection unit that connects the devices and the second connection unit that connects to the servers;
  an obtainer that obtains connection states by said connection controller based on the connection information; and
  a presenter that presents the obtained connection states.

10. A communication processing apparatus comprising:
  a first connection unit that connects devices;
  a second connection unit that connects to servers;
  a switching unit that switches connections of said devices and said servers between said first connection unit and said second connection unit;
  a determiner that determines whether connection of a device to said first connection unit is permitted or unpermitted;
  a connection controller that controls said switching unit in accordance with a determination result from said determiner; and
  a provider that provides application processing for said devices connected to said first connection unit,
  wherein said connection controller controls said switching unit to limit application processing to be provided for said devices.

11. A communication managing apparatus comprising:
  a holder that holds connection information including a condition for determining whether each of devices is permitted or unpermitted to connect to a communication processing apparatus and communication paths from the devices to servers;
  a setter that sets the connection information in a connection controller of the communication processing apparatus, said connection controller controlling connection between a first connection unit that connects the devices and a second connection unit that connects to the servers;
  an obtainer that obtains connection states by said connection controller based on the connection information; and
  a presenter that presents the obtained connection states,
  wherein said setter has a determiner that determines whether each of the devices is permitted or unpermitted to connect to the communication processing apparatus,
  sets the connection information so as to disconnect between all of the servers connected to said second connection unit and all of the devices connected to said first connection unit, when said determiner has determined that a device is unpermitted to connect to the communication processing apparatus, and then
  sets the connection information so as to restore connections of the servers and other devices connected to said first connection unit except the unpermitted device, after said first connection unit has disconnected the unpermitted device.

12. The communication managing apparatus according to claim 11, further comprising a connection controller controlling connection between a first connection unit that connects the devices and a second connection unit that connects to the servers,
  wherein said setter sets the connection information in said connection controller of the communication managing apparatus.

13. A method of controlling a communication managing apparatus for connecting between devices and servers, the method comprising:
  causing a switching unit comprised in the communication managing apparatus to switch connections of the devices and the servers, between a first connection unit that connects the devices and a second connection unit that connects to the servers;
  determining whether connection of a device to the first connection unit is permitted or unpermitted to connect to the communication managing apparatus; and
  controlling the switching unit in accordance with a determination result in the determining,
  wherein in the controlling, the switching unit is controlled to disconnect between all of the servers and all of the devices, when it has been determined that a device is unpermitted to connect to the communication managing apparatus; and then restore connections of the servers and other devices except the unpermitted device, after the first connection unit has disconnected the unpermitted device.

* * * * *